United States Patent
Ries et al.

(10) Patent No.: US 12,495,074 B2
(45) Date of Patent: *Dec. 9, 2025

(54) HONEYPOTS FOR INFRASTRUCTURE-AS-A-SERVICE SECURITY

(71) Applicant: Oracle International Corporation, Redwood Shores, CA (US)

(72) Inventors: Christopher James Ries, Saratoga, CA (US); Nikkolas Anthony Lavorato, Toronto (CA); Kevin Raymond, Jr., Bedford, NH (US); Philip Nathan Andrews, III, New Ipswich, NH (US); Christa Agnes Johnson Scura, Contoocook, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,611

(22) Filed: Jul. 17, 2023

(65) Prior Publication Data

US 2023/0379362 A1 Nov. 23, 2023

Related U.S. Application Data

(63) Continuation of application No. 17/009,634, filed on Sep. 1, 2020, now Pat. No. 11,750,651.

(60) Provisional application No. 62/895,847, filed on Sep. 4, 2019.

(51) Int. Cl.
H04L 9/40 (2022.01)
H04L 67/141 (2022.01)

(52) U.S. Cl.
CPC ...... *H04L 63/1491* (2013.01); *H04L 63/0263* (2013.01); *H04L 63/08* (2013.01); *H04L 67/141* (2013.01)

(58) Field of Classification Search
CPC . H04L 63/1491; H04L 63/0263; H04L 63/08; H04L 67/141
USPC .......................................................... 726/22
See application file for complete search history.

(56) References Cited

U.S. PATENT DOCUMENTS

| | | | |
|---|---|---|---|
| 7,725,937 B1 * | 5/2010 | Levy | H04L 63/1491 713/188 |
| 9,602,536 B1 | 3/2017 | Brown, Jr. et al. | |
| 9,716,727 B1 * | 7/2017 | Seger | H04L 63/1491 |
| 9,860,208 B1 * | 1/2018 | Ettema | H04L 63/0227 |

(Continued)

FOREIGN PATENT DOCUMENTS

| | | |
|---|---|---|
| CN | 105376210 A | 3/2016 |
| CN | 106687974 A | 5/2017 |

(Continued)

OTHER PUBLICATIONS

U.S. Appl. No. 17/009,634 , "First Action Interview Office Action Summary", Feb. 7, 2023, 8 pages.

(Continued)

*Primary Examiner* — Dant B Shaifer Harriman
(74) *Attorney, Agent, or Firm* — Kilpatrick Townsend & Stockton LLP

(57) ABSTRACT

Techniques for using honeypots to lure attackers and gather data about attackers and attack patterns on Infrastructure-as-a-Service (IaaS) instances. The gathered data may then be analyzed and used to proactively prevent such attacks.

18 Claims, 12 Drawing Sheets

(56) References Cited

U.S. PATENT DOCUMENTS

| | | | |
|---|---|---|---|
| 9,912,695 B1* | 3/2018 | Chao | H04L 63/1425 |
| 10,021,131 B2* | 7/2018 | Daniel | H04L 63/1441 |
| 10,044,675 B1* | 8/2018 | Ettema | H04L 63/0227 |
| 10,050,999 B1* | 8/2018 | Rossman | H04L 63/1416 |
| 10,193,809 B1* | 1/2019 | Sharma | H04L 47/125 |
| 10,205,803 B1* | 2/2019 | Sharifi Mehr | H04L 43/06 |
| 10,333,977 B1* | 6/2019 | Shamul | H04L 63/1491 |
| 10,402,090 B1* | 9/2019 | Tsaur | G06F 3/067 |
| 10,686,809 B2* | 6/2020 | Boss | H04L 63/1416 |
| 10,785,258 B2* | 9/2020 | Lam | H04L 63/1416 |
| 10,855,722 B1* | 12/2020 | Vadlamani | H04L 63/1408 |
| 10,972,503 B1* | 4/2021 | Mohan | H04L 63/14 |
| 10,986,128 B1* | 4/2021 | Sellers | G06F 21/554 |
| 11,086,685 B1* | 8/2021 | Koppes | G06F 9/45558 |
| 11,750,651 B2 | 9/2023 | Ries et al. | |
| 11,824,874 B2* | 11/2023 | Kandachar Sridhara Rao | H04L 63/0236 |
| 2004/0128543 A1 | 7/2004 | Blake et al. | |
| 2007/0294762 A1* | 12/2007 | Shraim | H04L 63/1491 726/22 |
| 2012/0260247 A1* | 10/2012 | Huang | G06F 9/45545 718/1 |
| 2013/0007740 A1* | 1/2013 | Kikuchi | H04L 12/2874 718/1 |
| 2013/0305369 A1* | 11/2013 | Karta | H04L 63/1416 726/23 |
| 2015/0121529 A1* | 4/2015 | Quinlan | H04W 12/121 726/23 |
| 2016/0119377 A1* | 4/2016 | Goldberg | H04L 63/1408 726/12 |
| 2016/0323301 A1 | 11/2016 | Boss et al. | |
| 2017/0149825 A1* | 5/2017 | Gukal | H04L 63/1491 |
| 2017/0155666 A1* | 6/2017 | Seul | H04L 63/0236 |
| 2017/0223052 A1 | 8/2017 | Stutz | |
| 2017/0230336 A1* | 8/2017 | Bingham | H04L 63/1491 |
| 2017/0302683 A1* | 10/2017 | Kawauchi | G06F 21/566 |
| 2017/0331858 A1 | 11/2017 | Clark, III et al. | |
| 2018/0109547 A1* | 4/2018 | Boss | H04L 63/1416 |
| 2018/0375897 A1* | 12/2018 | Kawasaki | H04L 41/12 |
| 2019/0052675 A1 | 2/2019 | Krebs | |
| 2019/0081980 A1* | 3/2019 | Luo | G06N 20/00 |
| 2019/0089737 A1* | 3/2019 | Shayevitz | H04L 63/1425 |
| 2019/0268421 A1* | 8/2019 | Markuze | H04L 67/10 |
| 2020/0326963 A1* | 10/2020 | Bhattacharya | H04L 41/0895 |
| 2021/0194925 A1* | 6/2021 | Xiao | H04L 63/0227 |
| 2021/0211403 A1* | 7/2021 | Robinson | H04L 67/565 |
| 2022/0038447 A1* | 2/2022 | Thangellapalli | H04L 67/146 |
| 2022/0365866 A1* | 11/2022 | Mishra | H04L 41/12 |
| 2023/0179628 A1* | 6/2023 | Porras | G06F 40/30 726/22 |
| 2023/0370439 A1* | 11/2023 | Crabtree | H04L 63/0428 |
| 2024/0143373 A1* | 5/2024 | Wang | G06F 9/45558 |
| 2024/0179066 A1* | 5/2024 | Shen | H04L 41/122 |

FOREIGN PATENT DOCUMENTS

| | | |
|---|---|---|
| CN | 107809425 A | 3/2018 |
| CN | 107819731 A | 3/2018 |
| CN | 107872467 A | 4/2018 |
| CN | 108701066 A | 10/2018 |
| JP | 2013009185 A | 1/2013 |
| JP | 2019512761 A | 5/2019 |

OTHER PUBLICATIONS

U.S. Appl. No. 17/009,634, "First Action Interview Pilot Program Pre-Interview Communication", Nov. 17, 2022, 8 pages.

U.S. Appl. No. 17/009,634, "Non-Final Office Action", Feb. 7, 2023, 25 pages.

U.S. Appl. No. 17/009,634, "Notice of Allowance", Apr. 20, 2023, 13 pages.

Beham et al., "Intrusion Detection and Honeypots in Nested Virtualization Environments", 43rd Annual IEEE/IFIP International Conference on Dependable Systems and Networks (DSN), Jun. 2013, 6 pages.

European Patent Application No. 20860099.9, "Extended European Search Report", Jan. 2, 2023, 12 pages.

Kyung et al., "HoneyProxy: Design and Implementation of Next-Generation Honeynet via SDN", IEEE Conference on Communications and Network Security (CNS), Oct. 9, 2017, 9 pages.

Pandire et al., "Attack Detection in Cloud Virtual Environment and Prevention Using Honeypot", International Conference on Inventive Research in Computing Applications (ICIRCA), 2018, pp. 515-520.

International Patent Application No. PCT/US2020/049013, "International Preliminary Report on Patentability", Mar. 17, 2022, 7 pages.

International Patent Application No. PCT/US2020/049013, "International Search Report and Written Opinion", Dec. 15, 2020, 10 pages.

Shridhar et al., "A Prevention of DDos Attacks in Cloud Using Honeypot", International Journal of Science and Research (IJSR), vol. 3, No. 11, Nov. 2014, pp. 2378-2383.

Chinese Application No. 202080061725.5, Office Action mailed on Nov. 3, 2023, 18 pages (9 pages of Original Document and 9 pages of English Translation).

Chinese Patent Application No. CN202080061725.5, Notice of Decision to Grant mailed on Apr. 30, 2024, 6 pages (2 pages of English translation and 4 pages of official language copy).

Indian Patent Application No. IN202247004469, First Examination Report mailed on Mar. 3, 2025, 8 pages.

Japanese Patent Application No. JP2022-514618, Notice of Decision to Grant mailed on Jul. 9, 2024, 6 pages (3 pages of English translation and 3 pages of official language copy).

Japanese Patent Application No. JP2022-514618, Office Action mailed on Apr. 2, 2024, 11 pages (5 pages of English translation and 6 pages of official language copy).

Japanese Patent Application No. JP2024-130983, Office Action mailed on Feb. 12, 2025, 10 pages (5 pages of English translation and 5 pages of official language copy).

Japanese Patent Application No. JP2024-130983, Office Action, Mailed On May 27, 2025, 7 pages (3 pages of English translation and 4 pages of official language copy).

Japanese Patent Application No. JP2024-130983, Notice of Decision to Grant, Mailed On Sep. 16, 2025, 5 pages (2 pages of English translation and 3 pages of official language copy).

\* cited by examiner

HONEYPOTS FOR INFRASTRUCTURE-AS-A-SERVICE SECURITY

CROSS-REFERENCE TO RELATED APPLICATIONS

The present application is a continuation of U.S. patent application Ser. No. 17/009,634 filed Sep. 1, 2020, which claims the benefit of U.S. Provisional Application Ser. No. 62/895,847 filed Sep. 4, 2019. These applications are herein incorporated by reference in their entirety for all purposes.

TECHNICAL FIELD

The present disclosure relates to computer security, and more particularly, to techniques for using honeypots to lure attackers and gather data about attack patterns on Infrastructure-as-a-Service (IaaS) instances. The gathered data may then be analyzed and used to proactively prevent such attacks.

BACKGROUND

With the rapid increase and popularity of cloud-based services (e.g., Software-as-a-Service (SaaS), Platform-as-a-Service (PaaS), Infrastructure-as-a-Service (IaaS)), an increasing number of organizations (e.g., companies, businesses, government entities, educational institutions) are subscribing to cloud services provided by cloud service providers for performance of their critical business operations. As the number of such cloud-provided offerings increases, cloud service providers are facing increased security threats from attacks by malicious users to infrastructures that provide the cloud services. Subscribers of the cloud services (e.g., organizations) are also adversely impacted by these attacks. It is in the best interests of the both the subscribers and the cloud service providers to be able to identity and prevent such attacks.

However, with respect to cloud offerings, many times it is unclear how the attack will occur and/or how to prevent it. This is because cloud security is relatively very new—it is a newer type of security as opposed to traditional network and/or device level security. Existing cloud security solutions are very unsophisticated and reactive in nature—we got attacked, now let's figure out what to do.

While early cloud attacks were directed to instances offering SaaS and PaaS services, more recently, as more and more compute, storage, and virtual networks get abstracted into the cloud and exposed via various IaaS instances, there is an increase in attacks on IaaS instances. For example, the popularity of cryptocurrencies like Bitcoin has resulted in an increasing frequency of IaaS instances being attacked to "steal" compute, memory, and networking resources for performing cryptocurrency mining (e.g., mining for Bitcoins) which requires extensive computer, storage, and networking resources. Compared to SaaS and PaaS attacks, IaaS attacks are even less well understood.

BRIEF SUMMARY

The present disclosure relates to computer security, and more particularly, to techniques for using honeypots to lure attackers and gather data about attack patterns on Infrastructure-as-a-Service (IaaS) instances. The gathered data may then be analyzed and used to proactively prevent such attacks. Various embodiments are described herein, including methods, systems, non-transitory computer-readable storage media storing programs, code, or instructions executable by one or more processors, and the like.

In certain embodiments, techniques are provided for luring an attacker to establish a session with a honeypot server. The honeypot server receives a request from the attacker, where the request is related to an Infrastructure-as-a-Service instance (IaaS instance). The honeypot server generates a response to the request and causes the response to be communicated to the attacker responsive to the request. The honeypot server also records data related to the attacker and related to one or more interactions by the attacker with the honeypot server. In some embodiments, a network (referred to as a honeynet) of honeypot servers may be provided.

As part of processing the request received from the attacker, the honeypot server determines an action corresponding to the request. The action can, for example, be an action requesting instantiation of the IaaS instance. The honeypot server then instantiates the requested IaaS instance using at least one of computer resources, storage resources, or networking resources. The honeypot server then sends the response back to the attacker indicating that the IaaS instance has been successfully instantiated.

In certain instances, the request received from the attacker may request an action to be performed using the IaaS instance, wherein the IaaS instance has previously been instantiated. The honeypot server may then generate a response to the request by applying the action to the previously instantiated IaaS instance.

In certain embodiments, the honeypot server may determine that the request requests an action to be performed, where the action is to instantiate an IaaS instance. The honeypot server may then generate a response to the request indicating that the requested IaaS instance has been successfully instantiated but without actually instantiating the IaaS instance. In some instances, the request from the attacker may request an action to be performed using an IaaS instance. The honeypot server is configured to generate an appropriate response to the requested action without actually performing the action and also without an IaaS instance being instantiated. In such scenarios, the honeypot server may use rules information to generate the appropriate responses. For example, the rules information may include information identifying multiple actions and, for each action, at least one response corresponding to the action. The honeypot server may then use this rules information to find the appropriate response for the attacker requested action. In one embodiment, the honeypot server may search the rules information to find an entry in the rules information where an action corresponding to the entry matches the attacker requested action. The honeypot server may then use the entry to determine the response to be sent to the attacker so as to make the attacker believe that the requested action has been successfully performed.

Different techniques may be used to lure an attacker to a honeypot server. For example, a set of one or more credentials may be advertised over one or more ports, such as a Shell (SSH) port 22 or a File Transfer Protocol (FTP) port 21, which are commonly searched for by attackers to orchestrate attacks. The credentials may include username-password pairs, certificates, keys, identifiers (e.g., tenant identifiers), and the like.

The attackers can come in different types. For example, an attacker could be an automated bot. In some instances, the attacker could be a user orchestrating attacks using an application such as a browser, GUI-based application, etc.

The foregoing, together with other features and embodiments will become more apparent upon referring to the following specification, claims, and accompanying drawings.

DETAILED DESCRIPTION

Figure 1:
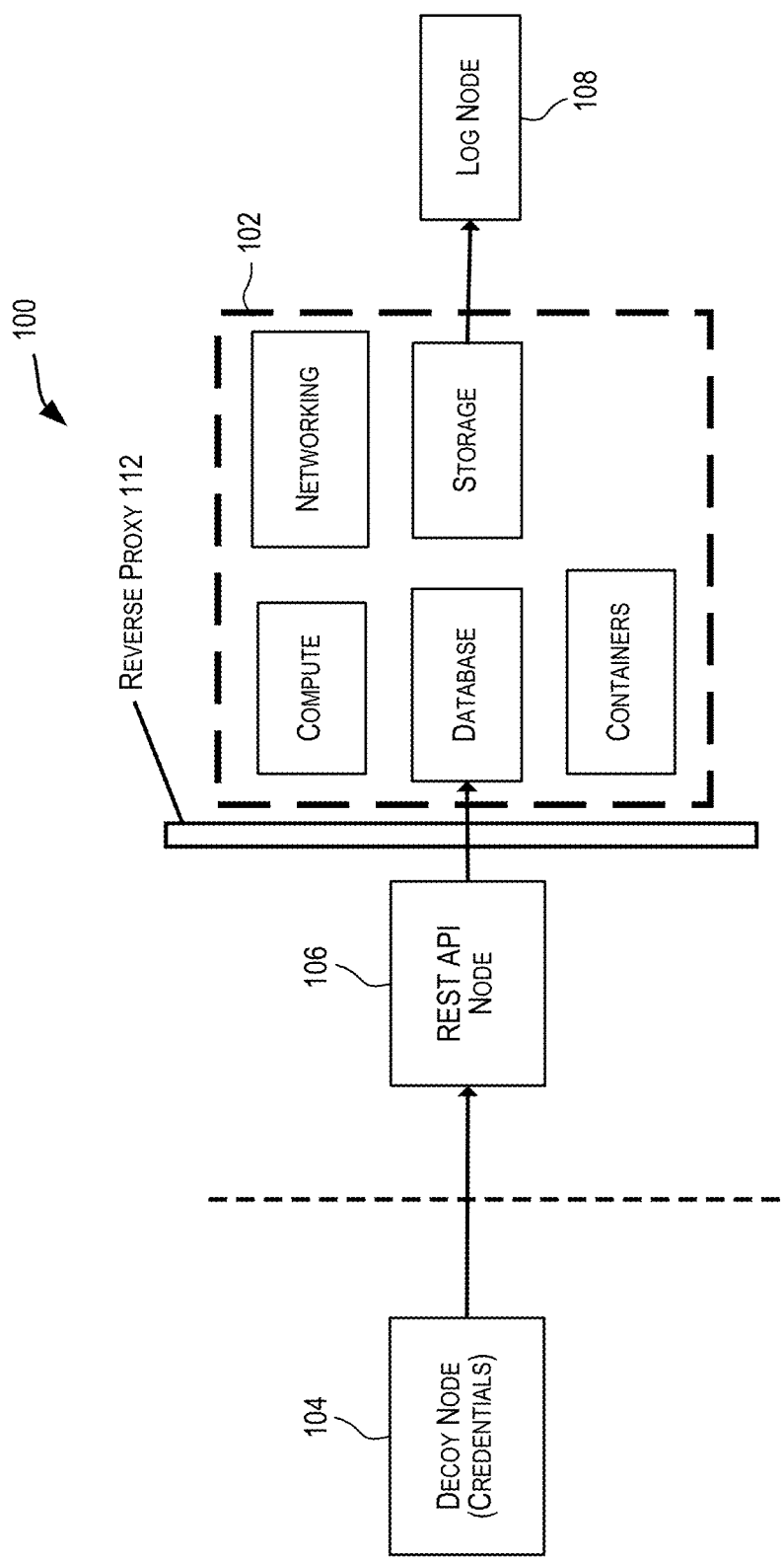
FIG. 1 depicts an implementation of a honeynet including a honeypot according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As more business operations are abstracted to the cloud, the overall threat surface for a given organization increases in parallel. There is a need for threat intelligence feeds that are sourced in-house to better understand how cloud environments are attacked in the wild.

The present disclosure relates to computer security, and more particularly, to techniques for using honeypots to lure attackers and gather data about attack patterns on Infrastructure-as-a-Service (IaaS) instances. The gathered data may then be used to proactively prevent such attacks.

In certain embodiments, one or more honeypot servers (honeypots) are set up where each honeypot server (honeypot) is some endpoint node that is set up deliberately for attackers to do some nefarious activity. For example, a fake banking application, a critical infrastructure related application (e.g., payment processing, oil rig temp), etc. Such honeypots are used to collect data about attackers.

In certain embodiments, a honeypot can be deployed to deceive a malicious user (referred to herein as the attacker) into thinking that the attacker has compromised a real instance, such as a real Infrastructure-as-a-Service (IaaS) instance, when in reality the attacker is operating out of an isolated dummy or virtualized resource provided by a honeypot server with no real impact on protected resources. A honeynet, or a network of such honeypots, can be deployed to emulate an IaaS service or service offering provided by a cloud services provider. For example, a honeynet (or multiple honeynets) may be provided to emulate Oracle Cloud Infrastructure (OCI) IaaS services offered by Oracle Corporation®. As another example, a set of servers may be set up as a honeynet with a restricted set of computing resources to mine bitcoins.

A honeypot server may be set up using a protocol like Secure Shell (SSH) or File Transfer Protocol (FTP). The honeypot may be set up with some credentials (e.g., username-password pairs, keys, etc.) that the attacker can access and login in with. The attacker is made to feel that they have hit the "jackpot" by accessing a real IaaS instance.

When an attacker interacts with a dummy IaaS instance, the honeynet infrastructure is configured to provide appropriate responses to the attacker to fool the attacker into believing that the attacker is interacting with a real IaaS instance instead of a dummy instance. In certain embodiments, a precanned/prebaked interaction flow may be set up with the proposed attacker.

An attacker's interactions with a honeypot (and the honeynet) are recorded or logged. The data recorded for an attacker may include activities of the attacker (e.g., user behavior patterns of a threat actor, other attributes unique to the user), unique attributes about the attacker, such as connection and device-level attributes of the specific attacker (e.g., connection information, IP Address of a device used by the attacker for originating attack calls and requests, Autonomous System Number (ASN) Traceroute information, Domain Name, etc.), and other data related to an attack. The recorded data may include data about an attacker's sequence of actions, objects accessed by an attacker, API calls made by the attacker (e.g., REST API calls made by the attacker), and the like.

The logged data can then be analyzed to identify information and analytics regarding attack patterns. For example, the logged data may be used to answer questions such as: how did the attacker orchestrate the attack; what was the attacker attacking; what was the purpose or intention behind the attack; what is the frequency of the attack; etc.

A honeynet, as described herein, provides an additional and essential protective mechanism for cloud security where a threat vector is oftentimes not binary, but rather composed of a number of sequential actions or unique attributes. When integrated into a data lake and its respective extract, load, and transform mechanisms it is possible to use unsupervised machine learning techniques to determine new zero day threats (e.g., threats that have not been seen before).

The data captured or recorded by a honeynet can then be used to uniquely identify specific attackers and classes of attackers and find patterns with respect to their attacks. The data collected using a honeynet becomes important for understanding attack mechanisms and to prevent those going forward, including zero day vulnerabilities that an organization may not know about. The honeynet service can be offered as a security service such that when a particular IP address is identified as a bad address it can be flagged and appropriate action taken.

The data recorded or logged by a honeynet can be sent to an analytics platform for performing analysis. For example, the recorded data may be sent to artificial intelligence (AI) based machine learning (ML) platform for building one or more models for identifying such attacks. The data captured by a honeynet system provides valuable and relevant training data that can be used to further enhance the machine learning techniques being used to identify security threats. New enhanced security models can be built using data logged by the honeynets.

The data recorded by a honeynet for an attacker or multiple attackers may be used for various purposes. In certain embodiments, the data collected by one or more honeynets may be forwarded from the honeynets to a centralized logging server. The logging server may then forward or provide access to the collected data for analysis. For example, the collected data may be forwarded for analysis and use by a threat intelligence tool that is configured to identify the attacker and similar threats. For example, the threat intelligence tool may use the collected IP network information and its association with a threat actor to identify similar attacks. The collected data (e.g., key pair values, events, objects information, etc.) may be fed into a machine learning pipeline to learn information about characteristics of a threat attack. The data may be used to understand a sequence of events with respect to current users, and derive from their cloud activity profile whether they pose threats.

In certain embodiments, a machine learning pipeline used for analyzing data recorded by one or more honeynets may be implemented using a distributed streaming platform such as an Apache Kafka pipeline. The events and audit logs collected by the honeynets are provided to the Kafka pipeline, which stores the data in a data lake. The stored data may then be subjected to a clustering algorithm such as a K-means or a K-means++ algorithm to identify threat profiles and identify threats.

Proactive preventive actions may then be initiated against identified threats. In some instances, it may be possible to identify such threats and take preventive actions even before the malicious actions are performed. For example, alerts may be generated when information in a user's activity profile matches information or a profile generated based on data collected by a honeynet regarding attackers. In some other instances, the threat may be identified and preventive actions taken in a quick time frame such that the time that an attacker has to perform malicious actions is reduced. For example, a threat may be identified as soon as one or two actions that match the profile of an attack are identified.

In certain embodiments, the security functionality provided by a honeynet can itself be offered as a cloud service. Such a cloud service may be configured to, for a subscribing tenant, identify access to the resources and flag inappropriate accesses and take appropriate responsive actions (e.g., when a particular IP address is identified as a bad address it can be flagged and appropriate action taken).

The honeynet, or network of honeypots, is thus used as a tool to capture and collect data about attackers and to get into the attackers' minds—to understand where and how such attacks originate and are being carried out, the resources that are attacked, action patterns during such unauthorized accesses, sequential information, what their motives are as well as to get contextual information about them (e.g., where they are coming from, what kind of operating system are they using, what time of day are they attacking, and other attributes associated with the attacks). A honeynet can be used to find out more data about such attacks without compromising actual valuable resources. For a cloud service provider, one or more honeynets, each honeynet comprising one or more honeypots, may be set up at one or more data centers of the provider. A honeynet enables new types of threats to be proactively identified and enables cloud security software/personnel to stay one step ahead of attackers by getting better data proactively in an autonomous manner.

Example Embodiment #1

The following describe an example workflow according to certain embodiments. The workflow described below includes several steps. These steps and their order is not intended to be limiting.

Step 1: Making the Honeynet Accessible by Attackers (e.g., by Dark Web Users)

The first step involves setting up the honeynet such that attackers are attracted to the honeynet. In certain embodiments, a set of servers may be set up to intercept requests from attackers over some protocols such as HTTP or FTP. Conveniently, some credentials may be stored in some csv or database file in a directory structure such that an attacker finds these conveniently placed credentials. When the attacker finds the dummy credentials to an instance of a service (e.g., IaaS instance), the attacker will then try to use the dummy credentials to access the service instance and use the resources that are available via that service instance.

Figure 2:
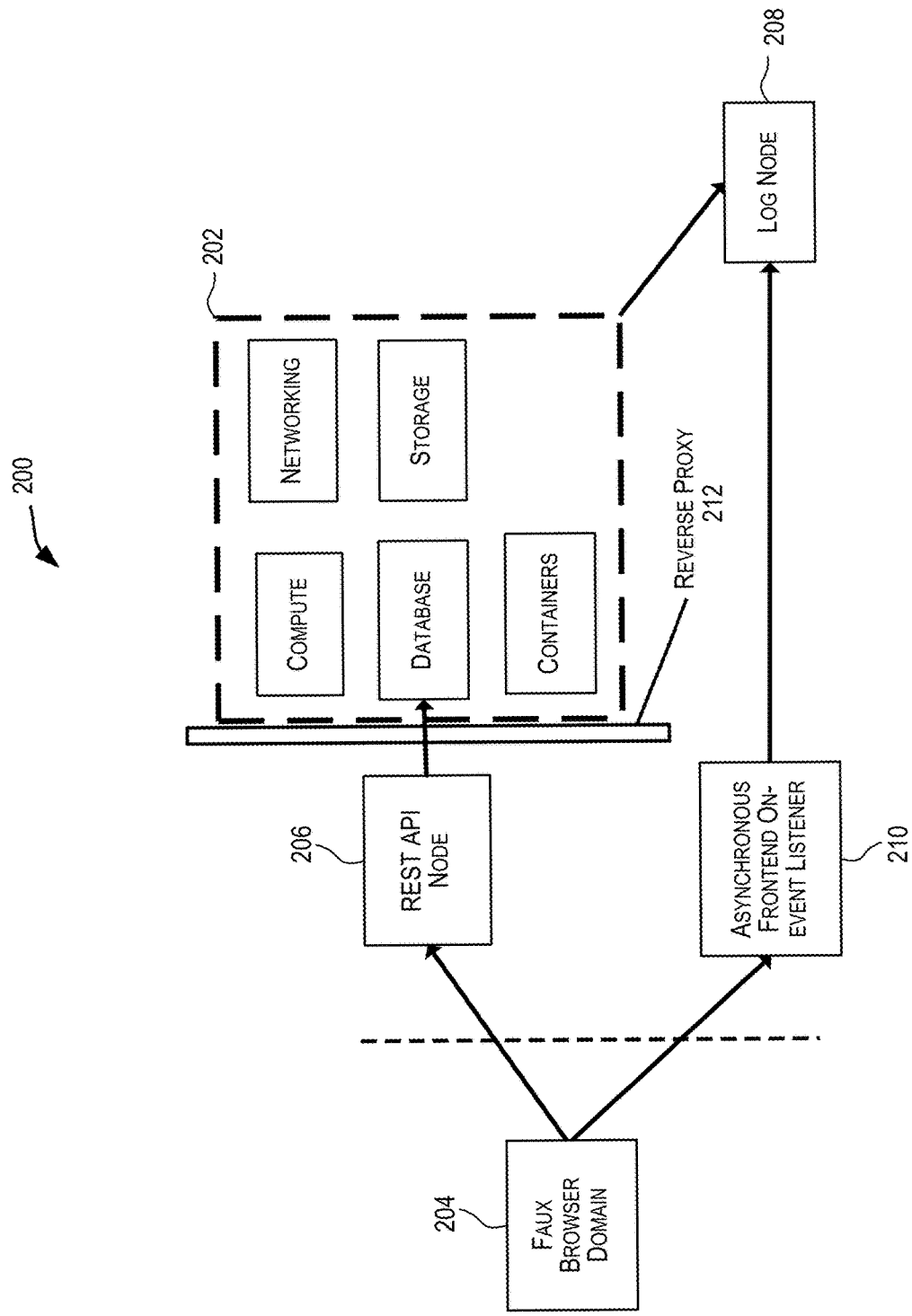
FIG. 2 depicts another implementation of a honeynet including a honeypot according to certain embodiments.

For example, an attacker may intercept a decoy node, as shown in FIGS. 1 and 2, via FTP listen-mode on Port 22 or a Port 21 (used for secure logins, ftps, port forwarding, etc.). Credentials can be set to common naming conventions (i.e., root/password). Attacker looks through a successive list of directories and will find a .csv/.db file that will have the pre-pended text (superusers). The Dark Web User will find some randomly generated credentials, but placed on the topmost part of this file that specifies superusers. The credentials may be in the form of a superuser name/password. These credentials are meant to allow the attacker access to a dummy IaaS instance provided by the IaaS Honeynet that has been setup to be "attacked".

Various techniques may be used by the honeynet to identify an attacker. Generally, a normal user would not be looking for a decoy node on the Internet. For example, if some decoy node is being run on port 22 for SSH, the average regular user (example, a legitimate client or tenant of a cloud service provider) would not be trying to find that decoy node, and thus will not be looking through it to find credentials. The decoy node itself may be used as a mechanism for distributing dummy credentials, to which an attacker would be attracted to, and access and use those credentials to perform malicious activities. The attacker is led to think that the credentials have been inadvertently left on the decoy node open on the port.

There are several ways in which an attack could take place, with the following two being the most common.
(1) Using an automated BOT. A bot may be configured to learn as many credentials as possible, and then a script may be used to perform bad things using the learnt credentials.
(2) The attacker is interested in interacting with the service himself or herself, for example, using a browser or some other GUI application. The attacker may use a GUI to interact with a cloud service (e.g., Oracle's OCI service). This may be done through a command line interface (CLI) (e.g., a request that is REST API driven) request that goes to some API endpoint that has the capability to perform actions in response to the attacker's requests. The GUI essentially is a wrapper around the CLI requests. The CLI requests may be generated using a command line mode or using some GUI interfaces.

In certain embodiments, honeynets described herein are able to handle both bot-based attacks and GUI-based attacks.

Step 2A: The Attacker is an Automated Bot (CLI-mode)

For the purpose of Step 2A, it is assumed that the attack is performed using an automated bot in command line interface (CLI) mode. FIG. 1 depicts a honeynet system 100 for handling requests received from an automated bot according to certain embodiments. The honeynet 100 may comprise one or more honeypots. In FIG. 1, the IaaS instance 102 provided by the honeynet is shown within dotted lines.

As depicted in FIG. 1, a decoy node 104 enables an attacker to access a REST API node 106, which may be a gateway to an instance 102 of an IaaS Service. In FIG. 1 (and in FIG. 2), the IaaS instance 102 (instance 202 in FIG. 2) is shown by a dotted line and comprises compute, storage, and networking resources. The decoy node 104 may provide an attacker access to credentials for accessing a honeynet comprising one or more honeypots, where the honeypots provide one or more "dummy' IaaS instances 102. The provided credentials enable the attacker to connect to one of the dummy IaaS instances provided by the IaaS honeynet.

The REST API (command & control) node 106 (206 in FIG. 2) acts as a broker between the attacker and the resources or objects that the attacker wants to do something nefarious to/with. For example, the REST API Endpoint 106 (206 in FIG. 2) serves as a broker for all resources/actions created from the CLI GET Requests being generated by the bot/attacker. In certain embodiments, the REST API node 106 receives CLI requests from an attacker, parses the CLI requests to understand the actions requested by the attacker, and provides the attacker with the expected outputs or responses for the requests.

The REST API node 106 also has the capability to trick the attacker into thinking that they have accessed and performed some actions on actual non-dummy resources. This is done by providing proper dummy responses to requests (e.g., GET, POST requests) received from the attacker to fool the attacker into thinking that they are actually being successful in their attack (i.e., successful in the actions the attacker is requesting to be performed). For example, the responses fool the attacker into thinking that the attacker was able to set up an IaaS instance and was able to do various operations using the instance. The REST API node 106 feeds the attacker false or dummy information making the attacker believe that they have been successful in their malicious activities, i.e., fool the attacker into believing that what he/she is requesting is actually happening. This node is used as a tool to keep the facade ongoing.

The REST API node 106 has the capability to process requests received from an attacker and feed the attacker expected information to fool the attacker into continuing the attack. In certain embodiments, the REST API node 106 is configured to:

(1) Receive and interpret requests received from an attacker and perform or pretend to perform the requested actions. These actions may include setting up the right resources (e.g., spinning up databases, computers, containers, etc.) as requested by the attacker.

(2) Provide responses to the attacker, including performing error handling, to make the attacker believe that they have accessed a real non-dummy instance.

With respect to interpreting requests and setting up resources, techniques for provisioning resources in response to subscription requests may be used to set up the instances. In certain embodiments, the REST API node 106 determines what resources the attacker is requesting based upon provisioning techniques used by the service provider. In some other embodiments, techniques such as RegEx (regular expression) scripts and/or an NLP (natural language processing) cached dictionary (e.g., leveraging the appropriate webhooks) may be used to handle the CLI GET requests from the attacker.

Various techniques may be used by honeynet to provide appropriate responses such that the attacker is led to believe that the attacker has accessed a real IaaS instance. In some instances, appropriate responses may be generated and provided by the honeynet to the attacker for a request without the requested action(s) actually being carried out. In some embodiments, the honeynet has pre-loaded POST requests to communicate to from the attacker's CLI tool of choice. One way of doing this is to use natural language processing (NLP) technologies, such as setting up and using an NLP dictionary with requests and responses that are sent back to the attacker automatically given the right conditions. There are different ways in which you can handle this, for example, using string parsing to understand what the request is asking and then determining the appropriate response from the dictionary.

In certain embodiments, as depicted in FIGS. 1 and 2, a Reverse Proxy 112 (in FIG. 1) (212 in FIG. 2) may optionally be provided as part of the flow that can grab additional information from the client and provide security and anonymity to the servers setup in a dummy virtual private cloud (VPC). The reverse proxy 112 may be configured to record some attributes about the attacker or the client device used by the attacker. The reverse proxy 112 also acts as a privacy and security barrier for the resources that are being spun up by the attacker. For example, an attacker may spin up some database or a computer or networking resource, and the reverse proxy 112 is used to anonymize the identities of the resources. The reverse proxy node 112 retains the anonymity of the instances 102, ensuring that the attacker does not know of their real identities.

The IaaS instance 102 resources that are interacted with by the attacker may be limited in compute, storage, and memory resources and provide a few basic functions. The IaaS services/objects accessed by the attacker provide the correct responses necessary to maintain the "integrity" of the IaaS instance.

Step 2B: Attacker is a "Real" User (GUI-mode)

In some instances, the attacker maybe a real user, for example, orchestrating the attack via an application executing on the attacker's client system, for example, using a browser of other GUI application to initiate access to the IaaS instance. A system 200 for handling requests and responses for GUI mode attacks is depicted in FIG. 2.

The processing for GUI-mode is quite similar to the processing for CLI mode. In GUI-mode, the attacker may be using a fake browser GUI 204 to initiate the attack and send requests. The attacker's interactions with the console (e.g., client device) and the GUI application can be recorded by log node 210 in FIG. 2 (node 108 in FIG. 1). For example, data can be recorded about the user/attacker login, the attacker's interactions with the browser (e.g., which links the attacker clicked on and the sequence of the clicks, etc.).

In certain embodiments, an asynchronous on-event-listener 210 may be used for collecting data about how the attacker is interacting with the GUI console. This collected data can be used to better understand the definitive actions that an attacker is taking at the backend but also what actions are taking place on the console itself.

Step 2C: Error Handling

In certain embodiments, the IaaS Honeynet API Control & Command Server provides the attacker with all Status: 200 responses unless the API GET Request is incorrectly formatted and/or output type is incorrect. In the event of incorrect format and/or data type, the REST API node 206 will send the attacker the correct Error handling code.

Step 3: Logging in Verbose-Mode

As depicted in FIGS. 1 and 2, in certain embodiments, a separate logging node (108 in FIGS. 1 and 208 in FIG. 2) may be set up to record all events/resources/objects that are accessed in the honeynet IaaS instance provided by the honeynet and accessed by an attacker. The logging may be performed in sequential order by time.

Step 4: ETL/Machine Learning Pipelines, Native Threat Intelligence Feeds, etc.

In certain embodiments, the logging node 1108, 208 or server stores all attacker interactions. The data may be stored in different formats, such as in raw .csv. The logged data may be periodically exported to an analytics platform for analysis. For example, a daily cron job may be used to upload the logged data to an ETL (Extract-Transform-Load)/Machine Learning Pipeline for future training. The logging server will provide core attributes unique to the attacker for a native threat intelligence feed that feeds directly into an internal-blacklist used by a security monitoring, detection, and prevention program to provide against future threats around actors that have previously attacked the IaaS Honeynet.

The amount of resources to be made available for the dummy IaaS instances set up by a honeynet may be determined based upon the allowable costs for luring the attackers and capturing attacker activity information. In some embodiments, a limited amount of compute, storage, and networking resources may be allocated. For example, a certain number of prebaked images may be provided, each with a fixed limited amount of compute, storage, and networking resources, and these prebaked images may be used to set up the attacker requested IaaS instances and to perform attacker-requested actions. These prebaked virtualized images or containerized images may be hardcoded such that they do not expand beyond some preset constraints.

A honeynet entices an attacker into connecting and setting up a session with the honeynet, and leads the attacker to believe that the attacker is attacking some real/legitimate resource and performing some desired malicious activity, and further entices the attacker into performing further bad activities. At some point, the honeynet may determine to stop the attacker's activities and shut down the attacker's session with the honeynet. In some instances, this point may be reached, for example, when the honeynet has ascertained that sufficient data about the attacker and the attacker's interactions with the honeynet and dummy instance have been recorded. In some other instances, this point may be time-based. For example, the honeynet may determine that the point has been reached when the total duration of time of the attacker's session with the dummy instance and the honeynet meets or exceeds some pre-configured time threshold. Various other factors may also be used to determine when to "cut off" the attacker. Combinations of the aforementioned factors and other factors may also be used in alternative embodiments.

Example Embodiment #2

An IaaS instance comprises a configuration of processing resources (e.g., cores, processors), storage resources (e.g., memory resources), and networking resources bundled together for offering compute, storage, and networking services. An IaaS cloud instance provides cloud virtualization at the lowest layer—at the memory, compute, and resource layer. An IaaS cloud offers service offerings related to compute and storage capabilities that are offered intertwined with networking capabilities. An IaaS instance attack is very different from a SaaS instance or a PaaS instance attack since SaaS/PaaS instance attacks do not involve attacking a compute/memory/networking resource but rather are directed to the data used by the SaaS/PaaS applications. With IaaS, there could be several resources involved, configurations of the resources are difficult to understand, and thus there is a paucity of existing solutions for preventing IaaS attacks. Monitoring IaaS resources and identifying attacks on those resources is very difficult because there are so many moving parts, each with their own configurations, and it is very easy for things to fall between the cracks. As a result, several IaaS attacks go on completely unnoticed.

Figure 3:
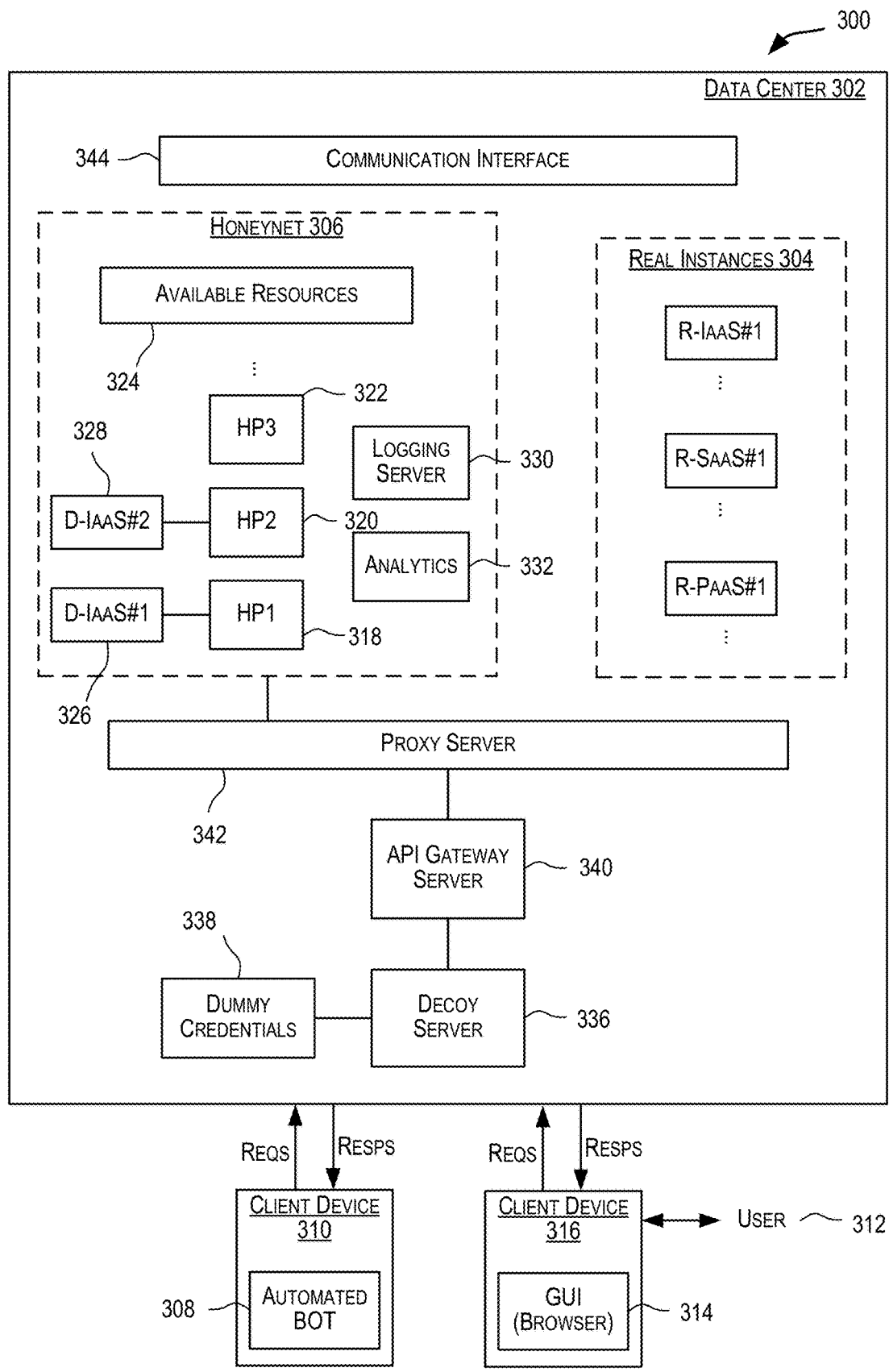
FIG. 3 is a simplified block diagram of a distributed environment incorporating a honeynet including one or more honeypots according to certain embodiments.

FIG. 3 is a simplified block diagram of a distributed environment 300 incorporating a honeynet including one or more honeypots according to certain embodiments. As shown in FIG. 3, distributed environment 300 comprises a data center 302 of a cloud service provider, where the cloud service provider may provide one or more of IaaS, PaaS, SaaS, and other cloud services. These services may be provided using one or more real service instances 304. The term "real" is being used here to differentiate these instances from "dummy" instances provided by a honeynet. The real service instances may include one or more real IaaS instances (e.g., R-IaaS #1) providing one or more IaaS services, one or more real PaaS instances (e.g., R-PaaS #1) providing one or more PaaS services, and one or more real SaaS instances (e.g., R-SaaS #1) providing one or more SaaS services. The infrastructure for providing these real cloud services is provided by the cloud service provider. For example, the infrastructure may be provided by data center 302. A customer or tenant can subscribe to one or more of the cloud services provided by the cloud service provider using data center 302.

Distributed environment 300 depicted in FIG. 3 is merely an example and is not intended to unduly limit the scope of claimed embodiments. One of ordinary skill in the art would recognize many possible variations, alternatives, and modifications. For example, in alternative embodiments, distributed environment 300 may have more or fewer systems or components than those shown in FIG. 3, may combine two or more systems, or may have a different configuration or arrangement of systems. The configuration of data center 302 depicted in FIG. 3 is just an example and is not intended to be limiting. While only one data center 302 is depicted in FIG. 3 for purposes of simplicity, a typical distributed environment can include multiple data centers possibly at different geographical locations. The multiple data centers may be communicatively coupled to each other via one or more communication networks. The communication network can be of various types such as the Internet, a wide area network (WAN), a local area network (LAN), an Ethernet network, a public or private network, a wired network, a wireless network, etc., and/or combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols.

Attackers that attack and make malicious and unauthorized use of resources provided by data center 302 can come in different flavors. Any entity that attempts to connect to data center 302 or use a resource provided by data center 302 without proper authorization is considered an attacker. For example, an entity that uses a dummy credential to access and use resources provided by data center 302 is considered an attacker.

Attackers can come in various forms including automated bot attackers or human user attackers. In the example depicted in FIG. 3, an automated bot 308 executing on a client device 310 may make attempts to attack and make unauthorized use of resources provided by data center 302. Automated BOT 308 may be configured to look for ways to intercept and connect to some end point node within data center 302 and then use that connection to make use of resources provided by data center 302. Attacks may also originate from a human user 312 who uses some application or software (e.g., a GUI browser 314) executing on a client device 316 to attack and make unauthorized use of resources provided by data center 302. The attacks themselves may be performed using different mechanisms such as command line interface (CLI) mechanisms, GUI-based mechanisms, and others.

The resources that are hacked into and maliciously used by the attackers (e.g., bots or human users) may include one or more of the real instances 304 provided by data center 302. For example, an attacker may attempt to connect to a real IaaS instance provided by data center 302 and start making unauthorized use of the compute, storage, and/or networking resources or services provided by that real IaaS instance. For example, an attacker may connect to a real IaaS instance and use that real IaaS instance to "steal" compute, memory, and networking resources for performing cryptocurrency mining operations (e.g., mining for Bitcoins) that require extensive computer, storage, and networking resources.

As depicted in FIG. 3, data center 302 provides a honeynet 306 that is configured to lure such attackers and collect data about the attackers without compromising real resources (e.g., real instances) of data center 302. Honeynet 306 comprises various components including a network of honeypot servers (or honeypots). Each honeypot may represent a particular IaaS service instance providing access to a specific set of IaaS resources. Each honeypot is configured to fool an attacker into believing that the attacker has successfully gained access to a real IaaS instance. Different honeypots 318, 320, 322, etc., may be provided for different types of IaaS services. While the embodiment depicted in FIG. 3 depicts a single honeynet, this is not intended to be limiting. A data center may provide one or more honeynets.

In the embodiment depicted in FIG. 3, honeynet 306 also includes a logging server 330 that is configured to receive or collect data about the attacks recorded by the honeypots. The collected data is then stored in non-volatile memory for subsequent analysis. In some embodiments, such as the embodiment depicted in FIG. 3, honeynet 306 itself includes an analytics platform or server 332 that is configured to analyze the data collected by the honeypots and logged by logging server 330. In some other embodiments, analytics platform 332 may be provided at the level of data center 302. Such an analytics platform may receive and be used to analyze data collected by one or more honeynets provided by data center 302. In some instances, the analytics platform may be remotely located from data center 302. In such an instance, logging server 330 may be configured to communicate data collected by honeynet 306 from data center 302 to the remote analytics platform using a communication interface 344 of data center 302.

In certain embodiments, a certain set of available resources 324 are set aside for use by the honeypots of honeynet 306. Available resources 324 may include compute resources (e.g., cores, processors), storage resources (e.g., memory), networking resources, database resources, containers, etc. A honeypot may use resources from available resources 324 to spin up a dummy IaaS instance that fools the attacker into believing that the attacker has connected to and is using a real IaaS instance. In some embodiments, the resources in available resources 324 may be prepackaged into bundles (called "pods") of resources, with each bundle comprising a preset configuration of certain compute, memory, and networking resources. A honeypot may then use one or more of these prepackaged bundles or pods to spin up dummy IaaS instances.

Data center 302 may provide one or more host machines (e.g., computer systems) that provide the infrastructure for providing the various services and components of data center 302 depicted in FIG. 3. The host machines may be used to provide real instances 304, one or more honeynets 306 and their components, and the various other servers and components of data center 302 depicted in FIG. 3. For example, the honeypots that are included in honeynet 306 may be deployed across one or more host machines of data center 302.

In certain embodiments, the honeynets are isolated and segregated from the real instances for security reasons. Accordingly, the infrastructure of data center 302 used to provide the honeynets is kept separate from the infrastructure used to support real instances 304. For example, the host machines used to execute and support honeynet 306 may be segregated from other host machines in data center 302.

Various different techniques are used to lure attackers to honeynet 306. Attackers, including automated bots and human attackers, generally look for SSH port 22 and FTP port 21 and use vulnerabilities provided by these ports to perform attacks. In the embodiment depicted in FIG. 3, a decoy server or node 336 is used to lure attackers. Decoy server 336 is configured to publicly broadcast information over one or more ports of data center 302, such as over SSH port 22 and FTP port 21, to draw an attacker's attention to these ports. When an attacker connects to one of these ports, dummy or fake credentials 338 are conveniently placed such that the attacker can access these credentials. In some embodiments, decoy sever 336 may broadcast information about the dummy credentials 338, while making it appear that the credentials are being broadcast inadvertently. The dummy credential 338 may include dummy restricted information such as dummy username/password information, API keys, MAC addresses, certificates, tenant identifiers, passwords, and the like. The goal is to make an attacker believe that they have acquired real credentials that they can use to attack a resource provided by data center 302. In certain embodiments, some default credentials may be set up as the dummy credentials. In some instances, the attacker may send an API call (e.g., GET cred) to access dummy credentials 338 and the dummy credentials are then sent as a response to that API call. Handling of an API call may be performed by API gateway server 340.

For example, in a typical scenario, for an entity (tenant) that has legitimately subscribed to services provided by a cloud service provider using data center 302, at the time of subscription (or subsequently), the tenant is provided one or more credentials that are customized for that tenant. These credentials enable the tenant to log into data center 302 and set up a session with a real instance (e.g., a real IaaS instance providing a particular type of IaaS service) providing the subscribed-to service. At the time of setting up a session, the tenant is requested for the credentials, which are then used to authenticate the tenant. A session is set up for the tenant upon successful authentication for a real instance that provides the service subscribed to by the tenant.

The dummy credentials also enable an attacker to set up a session, but unlike a legitimate tenant session, the dummy credentials are used to set up a session for the attacker with honeynet 306. The session may be set up with a honeypot in the honeynet, or with a dummy IaaS instance spun up by a honeypot.

Once an attacker gets access to some dummy, the attacker can send requests to data center 302 to set up a session for an instance and subsequent requests to perform one or more actions during the session. These requests may be in the form of API calls made by the attacker. In the embodiment depicted in FIG. 3, these API requests are received and processed by API gateway server 340. API gateway server 340 may be configured to read the request, potentially authenticate the request, and then forward the request to a backend component of data center 302 for processing the request.

For example, in the embodiment depicted in FIG. 3, an automated bot may get lured to a particular port of data center 302 and use the port to access a dummy credential 338. Automated bot 308 may then send a request to data center 302 with the acquired dummy credential requesting a session to be set up for the attacker. The request is received and processed by API gateway server 340 and, upon determining that the request is from an attacker, and not from a legitimate tenant of data center 302, is forwarded to honeynet 306 for handling. In certain embodiments, the request may be forwarded to a particular honeypot of honeynet 306 that is configured to provide the particular type of IaaS service requested in the attacker's request API call.

The API calls made by a legitimate tenant are the same as the API calls made by an attacker. Based upon the API call and the information received via the API call, API gateway server 340 has to determine whether the request is from a legitimate tenant or from an attacker so that the request can be forwarded to the appropriate backend component for handling. API gateway server 340 may use different ways to perform this identification, such as:

(1) For an API call requesting a session to be set up, the API call typically also includes the credentials (e.g., username/password) that are to be used for authenticating the requester prior to session setup. If API gateway server 340 determines that these credentials are dummy credentials, then API gateway server 340 knows that the request is coming from an attacker or bad actor. API gateway server 340 then forwards that request to a component of honeynet 306 for further handling.

(2) After an attacker logs in and is able to set up a session with a dummy IaaS instance, data regarding the attacker and the attacker' activities during the session are collected and logged. This logged data may include, for example, device level information regarding a device used by the attacker for originating the attack requests. In certain instances, this device level information can be determined from the API call itself. Accordingly, for an API call received by API gateway server 340, if API gateway server 340 determines that the device level information for the API call matches the device level information (which may have been previously recorded during the attackers interactions with data center 302) stored for an attacker's device, then API gateway server 340 determines that the API call is from an attacker and forwards that API call to a component of honeynet 306 for handling.

(3) API gateway server 340 may also use information regarding the port number over which a request is received to determine if the request is from an attacker. For example, as previously described, ports such as SSH port 22 and FTP port 21 are commonly used to orchestrate attacks. Accordingly, requests and API calls received via these ports may be tagged as requests from attackers. For example, in certain embodiments, API gateway server 340 knows, based upon the port of connection and based upon the dummy credentials, that the request is not legitimate and is instead a request from a bad actor or attacker.

(4) Combinations of various pieces of information described above may also be used to identify requests from attackers.

Upon identifying a request as originating from an attacker, API gateway server 340 forwards that request to a component of honeynet 306 for handling. In certain embodiments, upon identifying an attacker, API gateway server 340 connects the attacker to and opens a session for the attacker with a particular honeypot server from honeynet 306. For example, API gateway server 340 may set up a session for the attacker with a particular honeypot that is configured to provide the IaaS service requested in the request and then forward the request to that honeypot for further handling.

After a session has been established between an attacker and a particular honeypot, the attacker can send further requests to spin up an IaaS instance and to use resources provided by the IaaS instance. In certain embodiments, the honeypot may spin up a dummy IaaS instance, for example, dummy IaaS instance D-IaaS #1 spun up by HP1 318 in FIG. 3. The honeypot may then send a response back to the attacker indicating that the requested IaaS instance has been set up and is ready to use by the attacker. The response is such that the attacker believes that a proper—not dummy—IaaS instance has been spun up.

After a dummy IaaS instance has been spun up, during the session, the attacker may send one or more requests to perform various actions using the resources associated with the spun up IaaS instance. For example, the attacker may use the compute, storage, and networking resources provided by the dummy IaaS instance to perform actions such as bitcoin mining operations. The honeypot with which the attacker has an established session is configured to receive these requests, and for each request, interpret the request to identify one or more actions or operations requested by the request, to perform those actions using the spun up dummy IaaS instance, and generate and send to the attacker responses corresponding to the actions and requests. The responses that are generated are such that the attacker is led to believe that the response is a valid response from a real IaaS instance and that the attacker has been successful in using the services and resources provided by the spun up IaaS instance.

In certain embodiments, the honeypot is able to generate and send appropriate responses to the attacker corresponding to requested actions and API calls received from the attacker without actually setting or spinning up a dummy IaaS instance. For example, the honeypot may use a set of rules to generate the responses. The set of rules may include, a mapping identifying a set of possible actions that can be requested by an attacker and appropriate one or more responses for each action. Upon receiving a request from an attacker, the honeypot may translate the request to one or more actions and then use this mapping to determine one or more responses for the one or more actions. The one or more responses may then be communicated back to the attacker in response to the received request. The responses that are generated by the honeypot are such that the attacker is led to believe that attacker has been successful in spinning up an IaaS instance and using the services and resources provided by the spun-up IaaS instance, even though not even a dummy IaaS instance has been spun up. The rules information (e.g., the mapping information) may be stored in a non-volatile memory accessible to the honeypot, such as in a database.

In certain embodiments, a combination of a dummy IaaS instance and a set of rules may be used by the honeypot to generate responses to requests received from an attacker. In one such embodiment, the honeypot is capable of learning new rules, such as new mappings of actions and responses, based upon the spun up dummy IaaS instance. For example, the honeypot may learn a response to certain requested action received from an attacker using the dummy IaaS instance, and then add a new action-response mapping entry to the rules information. When the same action is requested in the future, the rules information, rather than the IaaS instance, is then used to generate an appropriate response to that action. One or more machine learning techniques may be used to learn and build and grow the rules information mappings.

In addition to processing requests, a honeypot is configured to collect and record data about the attacker and the attacker's activities and interactions with the honeypot. The data recorded for an attacker may include activities of the attacker (e.g., user behavior patterns of a threat actor, other attributes unique to the user), unique attributes about the attacker, such as connection and device-level attributes of the specific attacker (e.g., connection information, IP Address of the device used by the attacker, Autonomous System Number (ASN) Traceroute information, Domain Name, etc.), and other data related to the attack. The recorded data may include data about an attacker's sequence of actions, objects accessed by an attacker during the attacker's session with the honeypot, API calls made by the attacker (e.g., REST API calls made by the attacker), and the like. The logged data may include: information about API requests received from the attackers, responses generated and sent by the honeypots in response to the API requests, IP addresses from where the requests originate, port numbers used by the attackers to connect to the data center, JavaScript on.events (for GUI based interactions; for example, browser-based events on client devices may be monitored), device level information, interval of requests, etc.

In certain embodiments, a honeynet, such as honeynet 306, may include a logging server 330 that is configured to collect and/or receive data collected by the honeypots in the honeynet 306. In such an embodiment, the data collected by the individual honeypots may be forwarded to logging server 330. Logging server 330 is configured to store the data in a proper format. The data may be stored in a non-volatile memory accessible to logging server 330. Logging server 330 may also act as the controller for accessing the collected data.

In certain embodiments, honeynet 306 may include an analytics subsystem 332 that is configured to analyze the data collected by the honeypots in honeynet 306. The collected data may be analyzed to gain insights into attacker motivations (e.g., purpose and intention of the attacks), attack patterns, attack mechanisms, attack origination points (from a connectivity (e.g., IP address, domain, etc.) perspective, from a geographical perspective), different types of attacks, resources and objects accessed by attackers during the attacks, what was the attacker attacking, what resources were used, how were the resources used, operations performed during the attacks, frequency profile of the attacks, etc. In certain embodiments, based upon the analysis, profiles are generated for identifying attackers and attacks. These profiles may then be used to proactively prevent attacks before the attacks happen.

In certain embodiments, instead of having an analytics platform at the honeynet level or in addition to the analytics platform at the honeynet level, an analysis platform may be provided by data center 302. In such an embodiment, data collected by the one or more honeynets in data center 302 may be forwarded to this analytics platform for analysis. In certain embodiments, the analytics platform may be provided by a computing platform that is remote from data center 302. Such a remote analytics platform may be configured to collect and/or receive data collected by multiple honeynets spread across one or more data centers, aggregate the data, and then analyze the aggregated data.

Various different techniques may be used to analyze the data collected by the honeynets. In certain embodiments, machine learning (ML) techniques may be used. The data collected by the honeynets may be provided as training data and used to build and train a model for identifying attackers and attacks based upon the various criteria included in the collected data. Such a model can then be used to proactively identify attackers and attacks and to preferably stop such attacks before they occur.

In certain embodiments, a big data pipeline may be set up to process the collected data. for example, a Hadoop or data lake platform may be set up for receiving and processing the data collected by the honeynets.

In the embodiment depicted in FIG. 3, a reverse proxy server 342 is provided to provide security and anonymity of the servers and other components of data center 302 behind the proxy server. The reverse proxy stands between a client (such as clients 310 and 316) and anonymizes the servers behind the proxy. The client does not know which server it is connecting to. A reverse proxy server provides several benefits such as load balancing, caching, isolating internal traffic, logging, etc. Reverse proxy server 342 may also be configured to record some attributes about the attacker or the client device used by the attacker. Reverse proxy server 342 acts as a privacy and security barrier for the resources that are being spun up by the attacker. For example, an attacker may spin up some database or a computer or networking resource, and the reverse proxy server is used to anonymize the identities of the resources. The reverse proxy node retains the anonymity of the instances, ensuring that the attacker does not know of their real identities.

As described above, a honeypot is configured to respond to requests received from attackers, while collecting data about the attackers and their activities. At some point, the honeypot may decide to stop the attacker's activities and shut down the attacker's session. A honeypot may use various different factors, and combinations of the factors, to make this decision. Some of the factors include:

(1) Time threshold—The honeypot may decide to stop the user's session when the total duration of time of the attacker's session meets or exceeds some pre-configured time threshold.

(2) Interval time—Wait for an interval when the attackers stop interacting with the honeypot. For example, you can let the session activity continue while the attacker is interested. Generally, the more data that is collected by a honeypot, the more data is available for downstream analysis.

(3) Data-based—In some instances, the honeypot may decide to close the attacker's session when the honeypot has ascertained that sufficient data about the attacker and the attacker's interactions with the honeypot has been recorded.

(4) Various other factors may also be used to determine when to "cut off" the attacker. Combinations of the aforementioned factors and other factors may also be used in alternative embodiments.

In certain embodiments, an attacker may only be allowed to have one session with a honeypot. In such an embodiment, an attacker's attempt to open a subsequent second session is not allowed. In some other embodiments, multiple sessions, in parallel or in series, may be permitted. In such embodiments, information about the attacker may be persisted across sessions.

In certain embodiments, the functionality provided by one or more honeynets may be provided as a cloud service to subscribing customers. By subscribing to such a service, a customer can proactively identify attacks to their resources.

Figure 4:
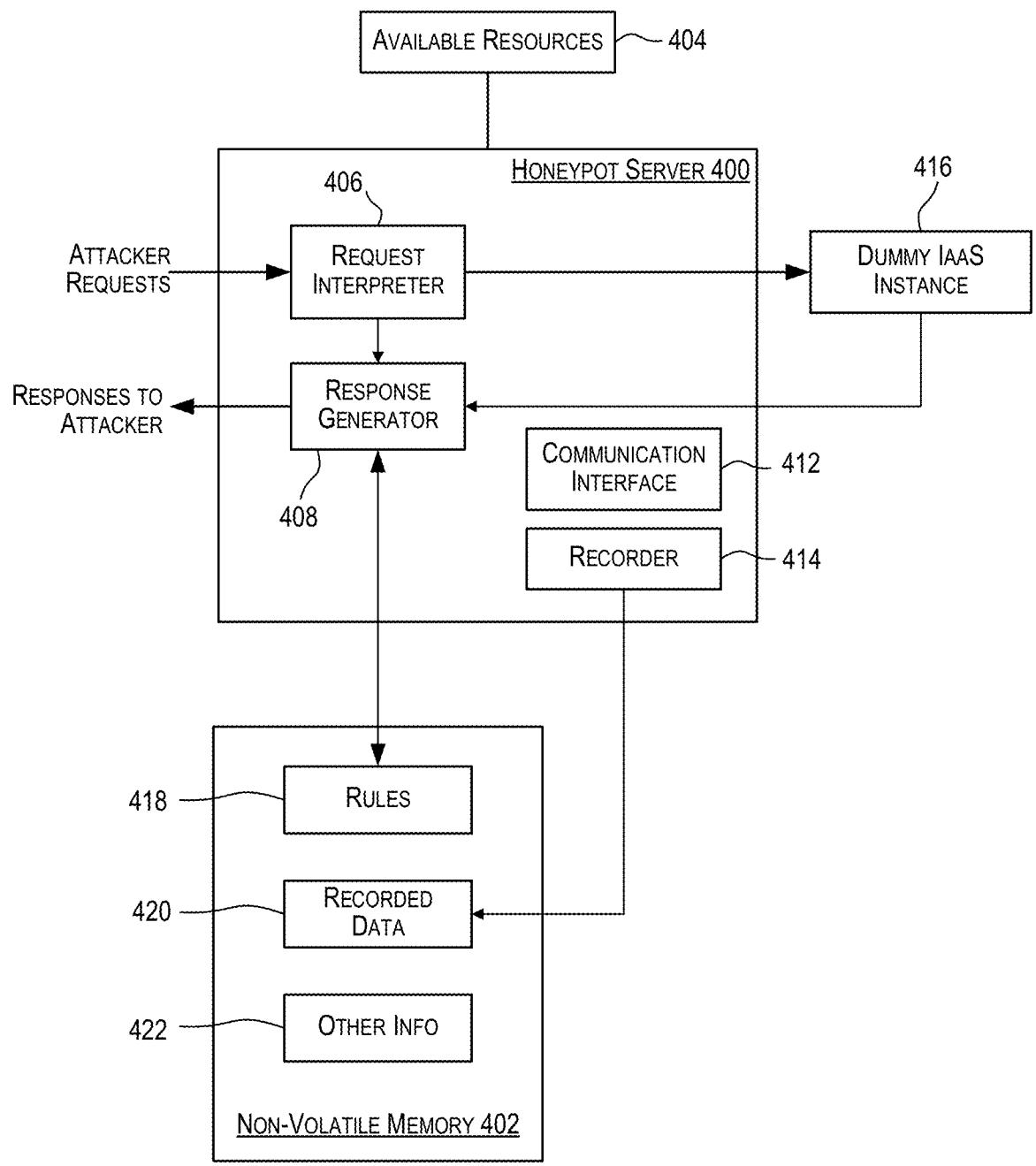
FIG. 4 is a simplified block diagram of a honeypot server according to certain embodiments.

FIG. 4 is a simplified block diagram of a honeypot server 400 according to certain embodiments. Honeypot server 400 (also referred to as Honeypot 400) may comprise multiple subsystems communicatively coupled to each other. In the embodiment depicted in FIG. 4, the subsystems of honeypot 400 includes a request interpreter subsystem 406, a response generator subsystem 408, a communication interface subsystem 412, and a recorder subsystem 414. These subsystems may be implemented in software only (e.g., program, code, or instructions executable by one or more processors), in hardware, or combinations thereof. Honeypot 400 depicted in FIG. 4 is merely an example and is not intended to unduly limit the scope of claimed embodiments. One of ordinary skill in the art would recognize many possible variations, alternatives, and modifications. For example, in some implementations, honeypot 400 may have more or fewer subsystems or components than those shown in FIG. 4, may combine two or more systems, or may have a different configuration or arrangement of systems.

Request interpreter subsystem 406 is configured to receive and interpret requests received from an attacker. For example, in certain embodiments, upon determining that a request or API call is from an attacker, API gateway server 340 selects a particular honeypot from honeynet 306 (e.g., as shown in FIG. 3) and forwards the request to the selected honeypot. At the honeypot, the request is received by request interpreter subsystem 406. Upon receiving a request, request interpreter subsystem 406 is configured to interpret the request and determine a set of one or more actions to be performed corresponding to the request. The one or more actions may include, for example, actions to set up or spin up an IaaS instance, use one or more resources provided by the IaaS instance, and the like.

If the action involves spinning up an IaaS instance, request interpreter subsystem 406 may use one or more resources from available resources 404 to set up a dummy IaaS instance 416. Dummy IaaS instance 416 may provide services that enable the use of one or more compute resources (e.g., processing resources such as processors, cores), storage resources (e.g., providing memory resources), networking resources, and other resources provided by dummy IaaS instance 416. For example, if an action to be performed corresponds to the use of a resource provided by dummy IaaS instance 416, then request interpreter subsystem 406 may cause the resource to be used in order to satisfy the attacker request. In certain instances, request interpreter subsystem 406 may apply the attacker requested actions to dummy IaaS instance 416. Honeypot 400 may be configured to spin up and use one or more dummy IaaS instances.

Response generator subsystem 408 is configured to generate dummy responses for the requests received from an attacker. The dummy responses generated by response generator subsystem 408 are such that the attacker is led to believe that the responses are valid and generated by a valid IaaS instance. This causes the attacker to continue with the attacker's activities without fearing that the attacker has been detected as a bad actor or malicious user.

A one-to-one, one-to-many, or many-to-one relationship may exist between actions and responses. According to a one-to-one relationship, each action can have its own response. According to a one-to-many relationship, an action can have multiple associated responses. According to a many-to-one relationship, one response may be generated and sent for multiple actions. Response generator subsystem 408 is responsible for generating the appropriate responses for a received attacker request.

Response generator subsystem 408 may use various techniques to generate the responses. According to one technique, request interpreter subsystem 406 may apply an action to be performed to dummy IaaS instance 416, which may then send a corresponding response to response generator subsystem 408. Response generator subsystem 408 may then forward the response received from dummy IaaS instance 416 as the response to the request. In some instances, response generator subsystem 408 may format or modify the response received from dummy IaaS instance 416 to generate the response to be communicated to the attacker.

According to a second technique, response generator subsystem 408 may generate responses for attacker requests using a set of rules 418 and without using dummy IaaS instance 416. In such embodiments, a dummy IaaS instance may not even be instantiated by honeypot 400. The rules information 418 may be stored in a non-volatile memory 402 accessible to honeypot 400, such as in a database. The set of rules 418 may include mapping information specifying mappings between actions that can be requested by an attacker and their corresponding responses. The one-to-one, one-to-many, or many-to-one relationship between actions and responses may be reflected in the mapping information.

Upon receiving a request from an attacker, request interpreter subsystem 406 interprets the request to identify the one or more actions to be performed corresponding to the request. Response generator subsystem 408 may then search rules 418 to identify appropriate responses to the requested actions. The responses identified based upon rules 418 may then be communicated back to the attacker as responses to the attacker's request. The responses that are generated by the honeypot are such that the attacker is led to believe that the attacker has been successful in spinning up an IaaS instance and using the services and resources provided by the spun-up IaaS instance, even though a dummy IaaS instance may not have been spun up. For example, honeypot 400 may receive a request from an attacker where the requested action is to instantiate (spin up/set up) an IaaS instance. Response generator subsystem 408 may then search the rules information (e.g., mapping information) to find an appropriate response for this request without actually setting up any IaaS instance, but the response indicates that the requested IaaS instance has been set up thereby fooling the attacker into believing that the attacker has been successful in setting up a valid IaaS instance.

Upon receiving a request from an attacker, request interpreter subsystem 406 may translate that request to a particular action to be performed. Response generator subsystem 408 may then search mapping information 418 to find an entry in the mapping information where the action in the entry matches the particular action to be performed. Response generator subsystem 408 uses this matching entry to identify a response corresponding to the matching entry, i.e., identify a response for the action. The determined response is then used to send a response to the attacker responsive to the received request.

In certain embodiments, response generator subsystem 408 may use a combination of the first techniques (i.e., using a dummy IaaS instance) and the second technique (i.e., using rules information 418) to generate responses for requests received from an attacker. Upon receiving a requested action from an attacker, response generator subsystem 408 may determine whether to use the first response generation technique or the second response generation technique, and then use that determined technique to generate a response that is communicated back to the attacker.

In some embodiments, response generator subsystem 408 may use machine learning rules to learn new action-to-response mappings and use this learnt information to add to the mappings in rules 418. These learned mappings may then be used for generating responses for subsequent requests received from attackers.

Recorder subsystem 414 is configured to record data related to attackers and their interactions with honeypot 400. Recorder subsystem 414 may also track and store information relating to requests and corresponding responses generated by response generator subsystem 408 and communicated to attackers in response to the requests. Recorder subsystem 414 may be configured to store the recorded data in non-volatile memory 402 as recorded data 420. In some embodiments, the recorded data may also be communicated from honeypot 400 to an external component, such as to another honeypot, to logging server 330, or even to a location remote (e.g., a remote analytics platform) from data center 302. The data collected by honeypot server 400 may also be pushed to a centralized collection server (e.g., a honeynet log server) which may then push it out to other analytics subsystems. The analytics could be on premise or somewhere else. The honeynet log server can determine what data to send to the analytics or may provide an interface for the analytics to pull data from the honey netlog server. In certain embodiments, communication interface 412 may facilitate communications of data to and from honeypot 400.

Non-volatile memory 402 may also store other information 422 that is used by honeypot 400 to perform its operations. For example, other info 422 may include configuration information, such as information regarding prefabricated instances (some customized combination "pods" of IaaS resources) that are usable by honeypot 400 for setting up dummy IaaS instances.

Figure 5:
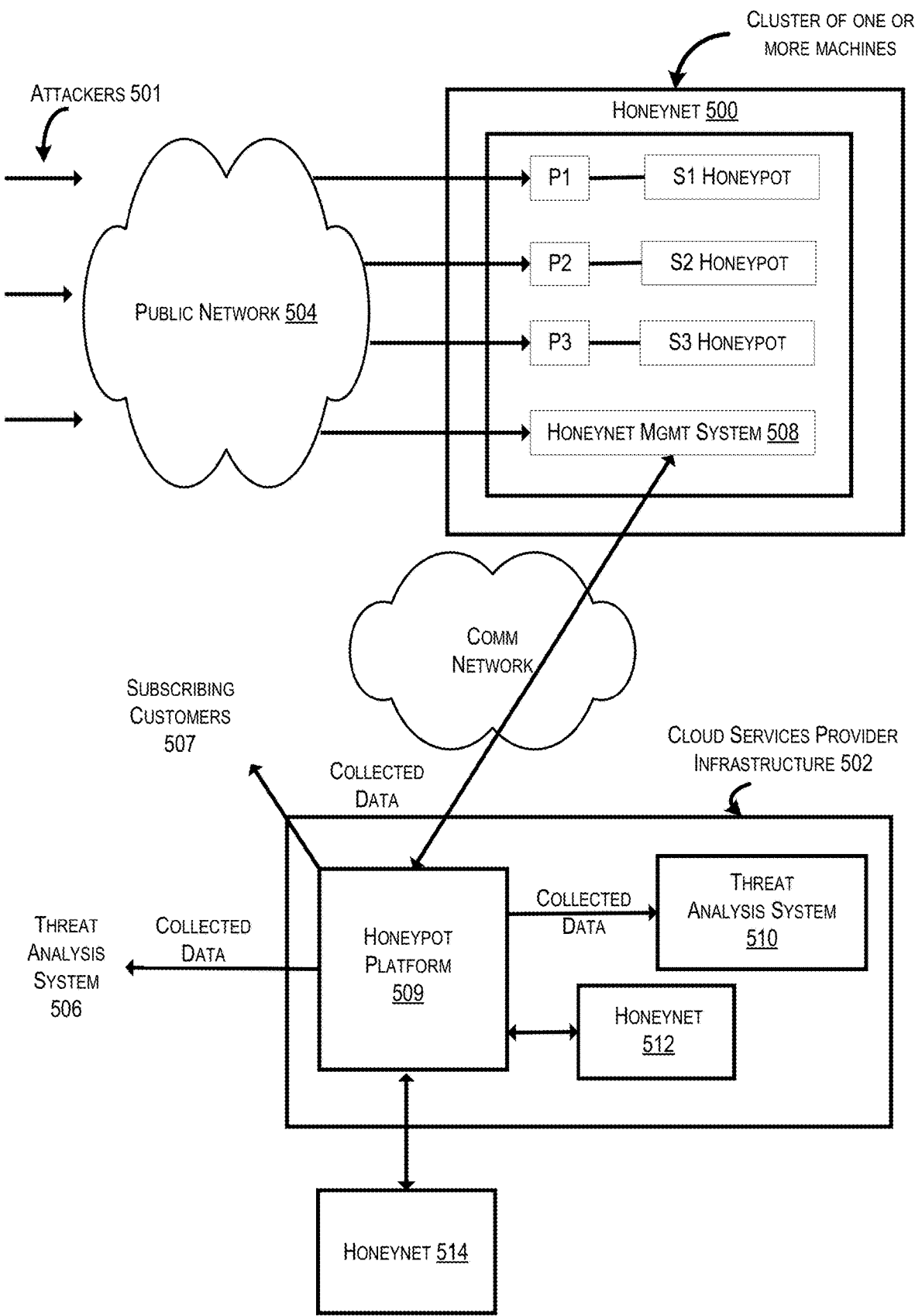
FIG. 5 depicts a simplified block diagram of a honeypot server according to certain embodiments.

FIG. 5 is a simplified block diagram of a honeynet 500 connected to a cloud services provider infrastructure 502 according to certain embodiments. The honeynet 500 may be a virtual compute instance and/or a cluster of one or more virtual machines. The honeynet 500 may be accessible over a public network 504 by the one or more attackers 501 described above and/or by the cloud services provider 502. The cloud services provider 502 may also be in communication with a threat analysis system 506 that can be configured to analyze collected data about the attackers and make recommendations, alerts, and/or threat prevention decisions based on the collected data.

In some examples, a set of honeypot endpoints (honeypot servers (or just honeypots) S1-S3) can be set up in the honeynet 500 where each honeypot is some endpoint node that is set up deliberately for attackers to do some nefarious activity. The honeynet 500 may be deployed on one or more host machines. These host machines can be isolated from the rest of cloud services provider 502 for security reasons (e.g., as shown in FIG. 5), or the host machines can be isolated within the cloud services provider 502 (e.g., as illustrated in FIG. 3, where HP1-HP3 are implemented within data center 302). A HoneyNet Management system 508 can be provided for deploying, configuring the honeypots S1-S3 and for performing local processing. While three different honeypots S1-S3 are illustrated in FIG. 5, any number of honeypots may be implemented within the honeynet 500. As will be described further below, the honeypots S1-S3 may be implemented in various shapes (e.g., types).

Different types of honeypots may be deployed in the honeynet 500 to emulate different kinds of services. Examples include: an SSH and/or Telnet honeypot to emulate SSH/Telnet services; an SMTP-based honeypot to emulate SMTP (e.g., an email server), SSL, and TLS; an HTTP honeypot to emulate HTTP (e.g., a web server), other honeypots for example for credential collecting to emulate services such as ftp, rdp, http, https, etc.; or a Web Logic honeypot to emulate Oracle WebLogic server environment; and the like. As such, each different honeypot may emulate a different type of server and may have a different shape. For example, a shape of a server may define the APIs used to access such servers, the file structure, etc. Customers 507 (e.g., of the cloud services provider 502) can request to deploy honeypots based on the honeypot shape/type that they're interested in, and then pick and choose the specific honeypot they want to utilize. The selection may be based on the type of service that customer runs (e.g., to collect attacker data for that type of service).

By implementing these various types of honeypots, it becomes possible collect different network-based indicators of compromise (IOC). When an attacker request comes in to the honeynet 500, it can be associated with an appropriate honeypot based upon the activity requested by the attacker, the port on which the request was received, or other criteria. Multiple attackers may interact with the same honeypot concurrently, and each honeypot is configured to provide appropriate responses to the attacker to fool the attacker into believing that the attacker is in a real environment and is interacting with a real IaaS instance instead of a dummy instance. This may be done through emulation. In certain embodiments, the honeypot may include an actual server (e.g., WebLogic server) to make the interactions more realistic. Through this interaction, a honeynet platform 509 implemented within the cloud services provider 502 environment can collect the network-based IOC, including specific malware samples related to specific attack types. The honeynet platform 509 can be provided for deployment and configuring the honeynet 500 and the various honeypots S1-S3. In certain embodiments, the Docker infrastructure is used for deploying and managing the honeypots and each honeypot is implemented as a Docker container (e.g., an isolated, virtualized bundle of software).

As noted, customers 507 can select various types of honeypots to be deployed based on their interests. They can choose honeypots, from a Docker configuration container, the specific honeypots they would like, as there are a number of different attack types that attack different threat surfaces. For example, there may be point of sale (POS) systems that provide access to payment information, healthcare systems that provide access to health records and other personally identifiable information (PII), or the like. Thus, a customer 507 may want to collect different types of data by exposing the different types of honeypots over a public network (e.g., the Internet). Each honeypot can log data regarding attackers' activities/interactions to a local persistent store. The honeypots may log raw unprocessed data. This data can then be processed locally to generate processed honeypot data. This processing may involve log rotation (e.g., rotating data every 5 minutes, or other interval of time), log validation (e.g., determining that data of interest is collected and in the right format), PII scrubbing to anonymize data, and data formatting (e.g., putting the data in the right format (e.g., JSON) for transport to a central system. The processed data can then be transmitted to honeynet platform 509, which may provide the data to the threat intelligence analysis system 506 (e.g., external service) or to an internal version of a threat analysis module 510. In some examples, either of the threat intelligence analysis systems 506, 510 can identify IP addresses of known attackers (e.g., detected from the log data garnered from honeypots that are distributed around the globe). These IP addresses can then be utilized by various security products to, in some instances, require step-up (e.g., multi-factor) authentication for any privileged access requests from any of these IP addresses.

One major concern of implementing honeypots is whether an attacker can gain kernel-level access from a honeypot, and then make their way into the main network (e.g., using a malicious binary or the like). This could lead to irreparable damage to the cloud service provider 502. Thus, isolation of the honeypots is crucial. In some examples, this isolation can be achieved by implementing the honeynet 500 using a third-party service provider (e.g., outside of the cloud services provider 502 that implements the honeynet platform 509. In this way, if an attacker is able to get beyond the honeypot into the underlying system, the attacker still won't be able to access the cloud services provider 502. However, another way to isolate the honeynet 500 is to implement the honeynet within Docker containers and/or to user bare-metal (e.g., an isolated, single-tenant, physical machine that is not shared by other services).

The honeynet 500 may be configured with various different types of honeypots. Honeynets 512 and 514 may be configured identically, or differently, as honeynet 500 as desired. For example, any configuration of honeynet 500 could also be implemented by honeynets 512 and/or 514. Honeynet 512, however, can be implemented within the cloud services provider 502, while honeynet 514 may just be any other honeynet (e.g., just like honeynet 500 which is implemented on a third-party host) implemented by the cloud services provider 502. Any number of additional honeynets, similar to honeynet 500 and 514 may be implemented, for example, at various locations across the world. As noted, honeynet 500 may include more than one honeypot. As one example, honeynet 500 includes a first honeypot S1, which is accessible by port P1; second honeypot S2, which is accessible by port P2; and honeypot S3, which is accessible by port P3. Each of the ports: P1, P2, P3 may be accessible over the public network 504. As such, if an attacker 501 scans the Internet for open ports, these ports will be exposed. This is intentional, and enables the luring of the attackers 501 into the honeypots. The honeynet 500 may deployed on a single host device (e.g., whether internal or external to the cloud services provider 502). This single host can be containerized such that there are various containers, with each honeypot being contained with a single container. As desired, other configurations may be implemented (e.g., with multiple hosts for the honeynet 500 and/or multiple honeypots within a single container). When a request comes in from an entity (e.g., an attacker), a type of the request and/or the port associated with the request may be used to determine which honeypot to connect with the entity. For example, if the request is for access to port P1, the honeynet management system 508 can determine, based on the request being at port P1, to connect the entity to the 51 honeypot that corresponds to port 22.

It may be known that various types of services use specific ports. For example, SSH services generally use port 22, SMTP services generally use port 25, FTP services generally use port 21, etc. Once a honeypot service is deployed within the honeynet 500, those services become reachable via an IP address that the host has been allocated. These services will then essentially have the same functionalities of any other server. Attackers 501 can scan the Internet for IP addresses, and can look for which ports of each IP address have been left open. An IP address with an open port would be a good target for an attacker. Thus, the honeypots can be built with these specific ports available over the Internet. Of course, the ports will generally require a password, even in the real world (e.g., the non-honeypot ports). In some instances, the password/username combo may be made public. However, in other examples, the honeypots may be configured with various known username/password combinations (e.g., username: admin, password: password is a common standard/default password). While not shown here, each honeypot port (e.g., P1-P3) may have a corresponding internal port number that is not known to the outside world. For example, port 22 may be the externally exposed and privileged (e.g., requiring a log in) port; however, the actual port that communicates with the honeypot may be some other port number. In this case, the honeynet management service 508 can keep a mapping between each external/privileged port and its corresponding internal (e.g., non-privileged) port number.

In some examples, the honeynet management system 508 may be accessible through some other/unknown port. The port for the honeynet management system 508 may be selected from a list of random/rarely used ports that an attacker wouldn't think to check. Additionally, the honeynet management service 508 allows services (e.g., customers) to manage and/or control how containers are set up, how the environment is configured, how the honeypots operate. In some instances, the configuration settings that the honeynet management system 508 uses to manage and/or control the honeypots can be controlled by the cloud services provider 502 (e.g., more directly, by the honeypot platform 509 of the cloud services provider 502). In some instances, a controller of the honeypot platform 509 operates in both the control plane (e.g., for controlling the honeynet 500) and the data plane (e.g., for fetching data associated with the honeynet 500). The honeypot platform 509 may also include a synchronizer configured to synchronize the logging of interaction data received from the honeypots. The honeypot platform 509 may also include a statistics collector, which can be configured to aggregate the data that is collected (e.g., the system logs, etc.).

As described, the honeynet 500 could instead be implemented within the cloud services provider 502 that controls the honeynet 500 (e.g., honeynet 512). This is obviously more dangerous from a security perspective, because if an attacker 501 were able to escape the container within which the honeypot is hosted, they could potentially get access to other private/secure information and/or resources of the cloud services provider 502. Having honeynet 500 hosted by a third-party provider would alleviate that risk. However, there are some benefits and advantages to hosting the honeynet 510 within the cloud services provider 502. For example, the threat analysis system 510 attacker data specific to those attackers who might want to try to exploit that specific service provider. One example, is Oracle's WebLogic server. Attackers that are looking to hack into Oracle's cloud infrastructure service, may look for a WebLogic server on port 80 or port 443. By having an emulated WebLogic server as a honeypot, and luring in attackers, Oracle could collect valuable data about would be attackers that are intentionally targeting known vulnerabilities of Oracle.

Using a similar example, Oracle may choose to build a honeynet like honeynet 512 that exists within the Oracle cloud infrastructure (OCI) service. In order to make the honeypots appear more realistic, the honeypot platform 509 may configure the honeynet 512 such that it appears more like a real Oracle server, even though it's just an emulation of a server that is in a container. This should work, as an attacker trying to hack into Oracle may check for a WebLogic server as evidence that they have successfully breached OCI. Thus, making the honeypots specific to the resident service provider can help catch sophisticated attackers that are targeting specific OCI applications (e.g., because they are aware of specific vulnerabilities therein).

Other examples of configuring the honeypots to look more real (e.g., in the Oracle example, to look like Oracle while hosted by Oracle) include having the honeypots designed to look like a Fusion Applications front-end (or any other application development suite). Once the attacker begins the session with the honeypot, the attacker may be presented with or have access to simulated Fusion data. Additionally, the honeypot could be configured to be hosted using an Oracle IP address. The honeypot platform 509 can then track and log the interactions the attacker has with the machine and possibly allow the attacker to ex-filtrate "marked" data, this data could then be identified when/if it is found out in the wild. In other words, some simulated data could be marked as such, and the attacker may be allowed to access it. If that attacker were to use that data outside of the honeypot, it would be detected, and the attacker could also be detected and potentially identified.

Another option would be to set up a mock control plane API that appears like the control plane API of the service provider (e.g., OCI in this example). This would be configured to look like the traditional APIs used by that service provider and have weak credentials allowing an attacker access. Again, the service provider would track what the attacker does while on the network. In some instances, bare-metal hardware may be used in order to insure that the attacker is not able to breach a customer who might be sharing a hypervisor. Each session could be tagged, and all network traffic in that tenancy monitored. In this way, the honeypot platform 509 could track sophisticated attack patterns and learn what exploits are used by attackers to move between machines.

As will be described in further detail below, a IaaS provider may be configured with service tenancies, data planes, control planes, particular subnets, IP addresses, gateways, etc. Given the patterns (e.g., architectures) described in FIGS. 9-11, it may be advantageous to emulate these patterns as closely as possible when configuring the honeypots. This applies whether the honeynet is run locally (e.g., honeynet 512) or is implemented externally (e.g., honeynet 500). Thus, the honeypot platform 509 may try to configure the honeypots instances to look like the infrastructure of the service provider hosting the honeypot platform 509, even if the honeypot itself is itself running outside of the service provider, such as on a third-party service providers machines.

Additionally, the honeypot platform 509 may be configured to provide a honeypot-as-a-service tool for others to use (e.g., subscribing customers 507). In this example, a customer may wish to run honeypots for their own data collection and attacker protection, but without the computing capabilities to do so themselves. Thus, the honeypot platform 509 could provide its ability to host honeynets of any type as a service to others. In one example, the service could be offered via one or more APIs and/or through a subscription service.

In some examples, a honeynet service may provide a single honeynet that is accessible by multiple different customers. However, in other examples, individual honeynets may be implemented (e.g., one honeynet per customer). Such a service could be hosted by the service provider (e.g., cloud services provider 502 using the honeynet 512) on behalf of a customer 507, or it could be hosted within the environment of the customer 507. Additionally, each customer 507 could customize what type of honeynet they want build, including which honeypot instances they want executed. Honeypots could be requested to be distributed across various honeynets, across various regions, in particular geographic areas, or the like. For example, a customer 507 could request a specific honeypot (e.g., a WordPress server) be implemented in a particular region (e.g., India). The honeynet platform 508 could then, in that example, build a honeynet (potentially with just the one honeypot) in India to track attackers who are targeting WordPress servers in that country. In another example, various honeynets could be built with multiple different honeypots already in containers and, upon request, the honeypot platform 508 could automatically deploy honeypot containers for the requested types in the appropriate honeynets.

As such, the honeypot platform 508 can be configured to receive requests from customers for honeynets or honeypots. The requests could include configuration information that identifies how many honeynets, where the honeynet(s) are to be deployed, what types and/or how many honeypots are to be deployed within the honeynet(s), and what types of data is to be logged. Based on the request, the honeypot platform 508 could build one or more honeynets and/or honeypots based on the configuration information. The data can be collected, logged, processed, and/or analyzed, and then transmitted to a threat analysis system (e.g., threat analysis system 506 and/or threat analysis system 512) and/or to the customer itself. The honeypot platform 508 could continue to implement these honeynets and/or honeypots as a service on behalf of the customer until an amount of time passes or until the customer requests to shut down the service.

Figure 6:
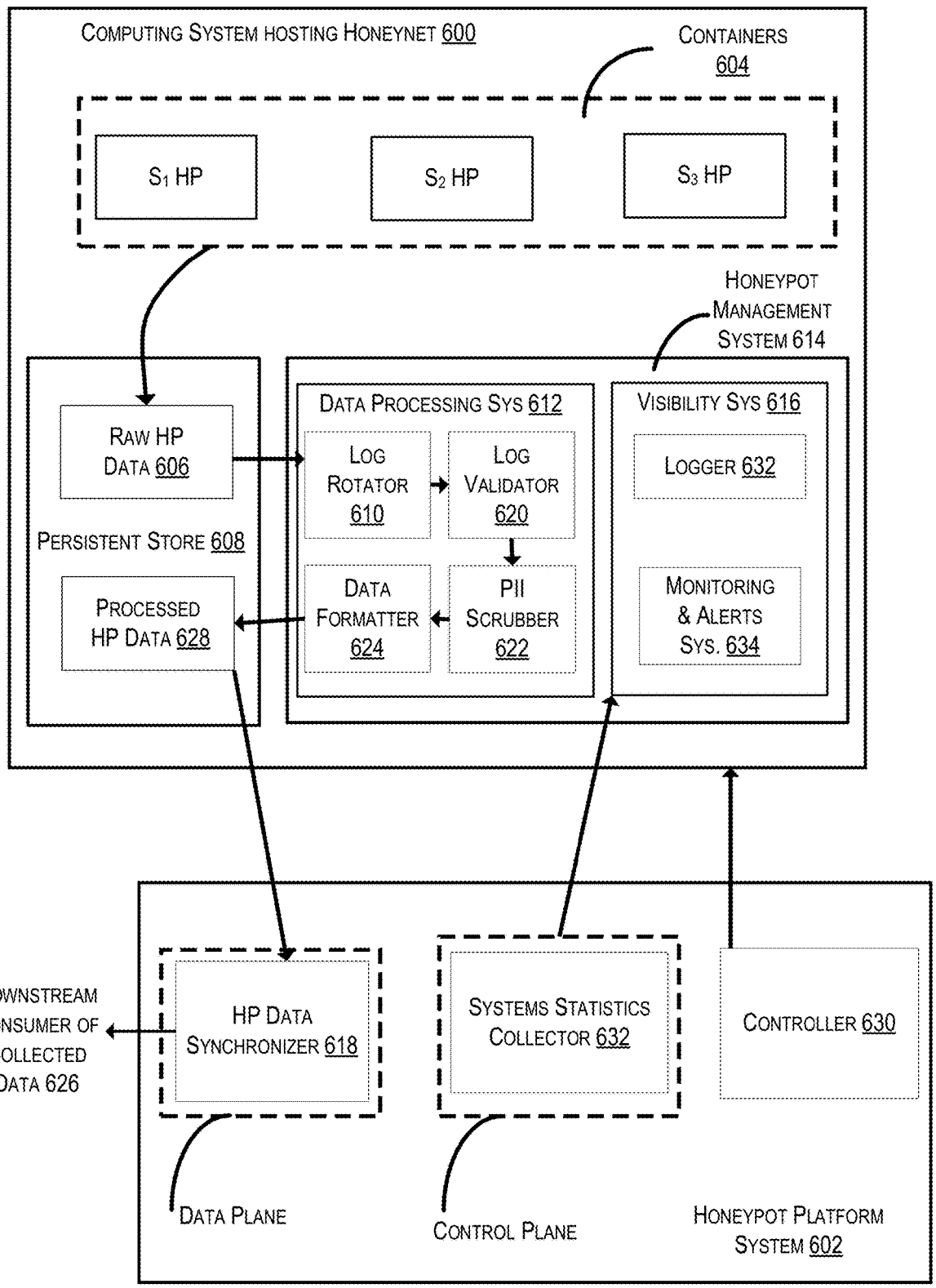
FIG. 6 is a simplified block diagram of a honeypot server according to certain embodiments.

FIG. 6 is a simplified block diagram of a computing system that can host a honeynet 600 on behalf of and/or controlled by a honeypot platform system 602. In some embodiments, the computing system hosting the honeynet 600 can be a third-party service provider (e.g., not the same computer that hosts the honeypot platform system 602). However, in other examples, they may be the same computing systems.

In some examples, the computing system hosting the honeynet 600 can have a base operating system and can implement containers 604 that can emulate one or more honeypots (e.g., honeypots S1, S2, S3, . . . , SN; collectively, honeypots S1-N). The honeypots S1-SN can be of any honeypot type (as discussed above), they can be containerized (e.g., implemented in the containers 604), and they can write data out to disk (e.g., by logging data to raw HP data 606 of persistent store 608). When an attacker accesses one of the honeypots S1-SN, is activity can be logged by being written to file at raw HP data 606. This data can be written in JSON format or the like. In some instances, each HP S1-SN may push out different types of data based on the type of server that each HP S1-SN is emulating. For example, each type of server may utilize and/or process different types of data. One example of this is that SSH data is much different from mail server data (e.g., SMTP).

In some examples, this data can be transmitted to the log rotator 610 of data processing system 612. The data processing system 612 is just one part of a honeypot management system 614 configured to manage the honeypots S1-SN, along with visibility systems 616. The log rotator 610 can rotate the log data at certain intervals (e.g., every 5 minutes or as desired). In some instances, the computing system 600 may not be able to control how the honeypots log data (e.g., it could log to one single file or a different file every day). So, the log rotator 610 is configured to rotate the logs on a particular interval that is desirable for the data processing system 612 or the host system 600 in general. The log data may be chopped down at each interval so that it can be synchronized with the HP data synchronizer 618. However, before transmitting the data to the HP data synchronizer 618, the data processing system 612 may first validate the data (e.g., using a log validator 620), scrub the data (e.g., using a PII scrubber 622), and format the data (e.g., using a data formatter 624). The data validator 620 may look at the type of the data captured, and make sure it is correct for the types of fields that the downstream consumer 626 (e.g., the customer) is interested in (e.g., if the data is an IP address, is it actually a 32 bit address, etc.). The PII scrubber 622 can be configured to scrub out personally identifiable information to obfuscate anyone's identity that could otherwise be detected. The data formatter 624 is configured to format the data into JSON format (or the like) so it can be shared (e.g., later, in the pipeline) with platform that understands that format (e.g., the HP data synchronizer 618). After being processed, the data can be stored in processed HP data 628 of the persistent store 608.

In some instances, persistent store 608 is configured as block storage (e.g., to save cost). As the honeypots S1-SN are running (e.g., they may be running in parallel) and consistently logging data to the block storage, first at raw HP data 606, but then in processed HP data 628 once processed. In some examples, more than one attacker may connect to a single honeypot. This is possible because each honeypot is an emulated server. So, the same honeypot instance (e.g., for each type) can communicate with multiple attackers at the same time, but the single honeypot will look like an individual instance to each attacker. However, the emulated honeypot instance is only stateful for a given session with each attacker. Thus, if an attacker logs out, a new log-in would get a new emulation of the same instance. Still, logs can be written in parallel for all attackers on the same instance.

As noted above, it would be advantageous to make the emulated servers appear to be real servers to the attackers. This will keep them logged in longer, so more data can be collected. This will also trick the attackers into trying more advanced techniques, which can also be logged and analyzed to learn from the attackers. Some techniques for making the emulated environment look real include providing a user interface (UI), creating fake accounts that the attacker can access, and/or running the instance and/or session on a bare-metal machine. As noted, the honeypots S1-SN are implemented in Docker containers (or other types of containers). Such containers are virtual environments that emulate each type of server or service being requested. Each honeypot S1-SN is a virtual container emulating an environment. If a hacker requests a list of the file system, it would be advantageous to reply with the appropriate response that makes the emulated environment appear real. For example, for a Web server, a response may show the attacker that the server is running Apache on port 80. The honeypots can also list files that would be standard files stored on a system that was actually running Apache.

As noted briefly above, attacker sessions may be stateful while logged into a honeypot. In some examples, sessions may refresh at a particular interval (e.g., five minutes or so). Since the vast majority of attacks are automated and only last a few seconds, five minutes is plenty of time for a single session. However, in some examples, a session may run as long as the attacker is logged in and still operating with the honeypot (e.g., making requests).

Once the data has been logged and processed, it can be transmitted back to the honeypot platform system 602, e.g., directly to the HP data synchronizer 618. The synchronizer 618 can be configured to fetch data from processed HP data 628 at time intervals (e.g., five minutes). The synchronizer is helpful in synchronizing the interval pushes of data so no data is missed. The synchronizer 618 can then push the data to downstream consumers 626 and/or to a threat analysis system. In some examples, a controller 630 of the honeypot platform system 602 can be configured to add, tear down, rebuild, modify, or otherwise control any of the honeypots S1-SN. Controller 630 may communicate with the honeypot management system 614 via an SSH-type connection and/or a secure shell application. Additionally, a systems statistics collector 632 is configured to collect information about system logs or any other log information. The systems statistics collector 632 may be implemented as part of the control plane of the honeypot platform system 602 and may also communicate with visibility systems 616 of the honeypot management system 614 via SSH. In some examples, the monitoring and alerts system 634 can be configured to check the files and file system that have been defined for monitoring. The monitoring and alerts system 634 can run checksums on the data to see if anything doesn't match and potentially restore the files. This is advantageous in case the attacker actually penetrates the honeypot platform system 602 (e.g., when the computing system hosting the honeynet 600 is the same computer hosting the honeypot platform system 602) and changed something. The monitoring and alerts system 634 can then alert the downstream customers, the third-party service (e.g., the computing system hosting the honeynet 600 and/or the honeypot platform system 602).

The logger 632 can be configured to present the logged data in a UI or other application configured for preparing the data for visualization.

Figure 7:
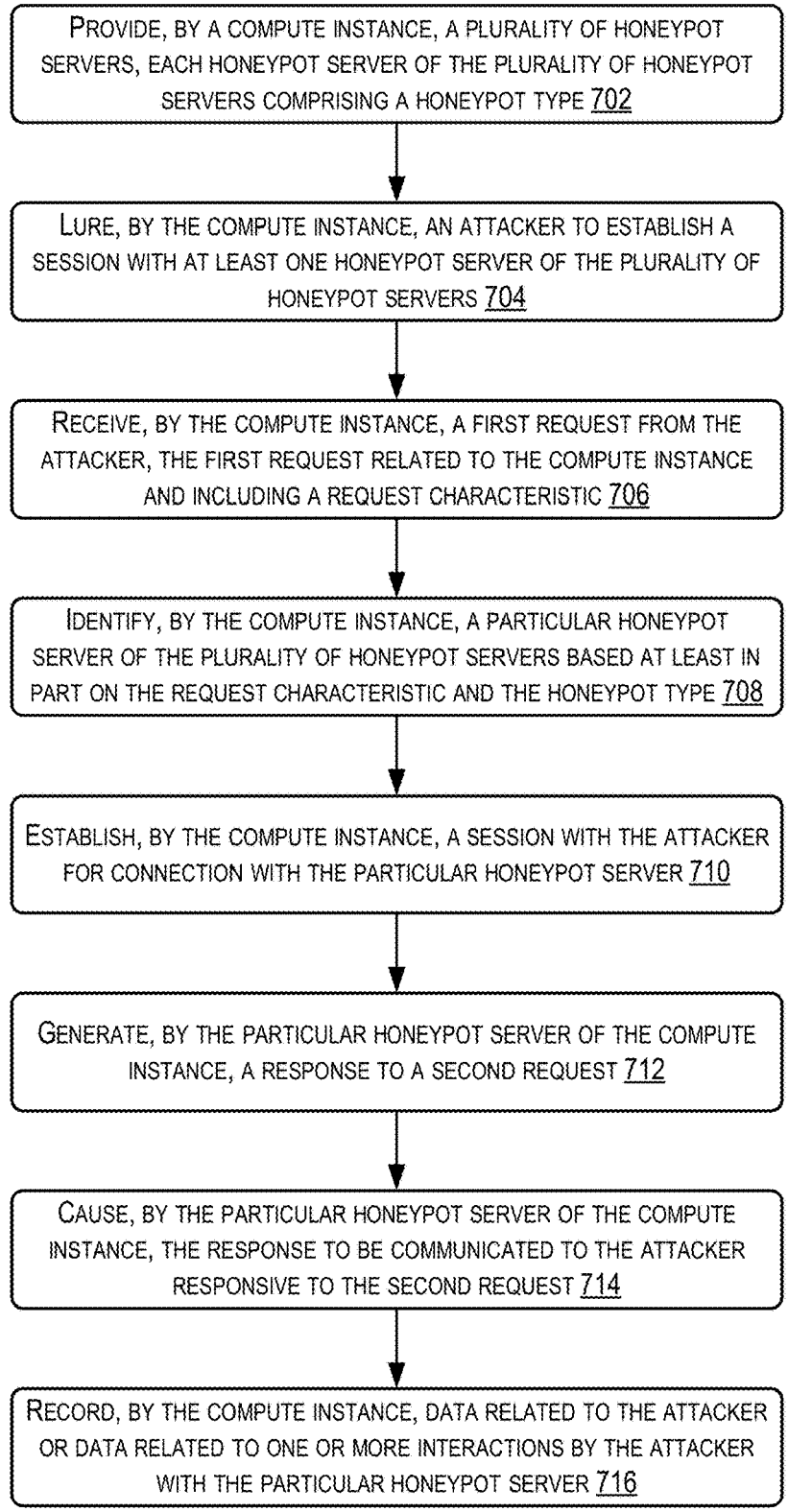
FIG. 7 is a flow diagram of an example honeypot implementation according to certain embodiments.

FIG. 7 is a flow diagram illustrating an example method 700 for performing the techniques described herein. Some or all of the method 700 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by software, hardware, or combinations thereof. The code may be stored on a computer-readable storage medium, for example, in the form of a computer program comprising a plurality of instructions executable by one or more processors. The computer-readable storage medium is non-transitory. The method 700 may be performed by one or more, or a combination, of the data center 302 of FIG. 3, the honeypot server 400 of FIG. 4, the honeynet 500 and/or the honeypot platform 509 of FIG. 5, or the computing system hosting the honeynet 600 and/or the honeypot platform system 602 of FIG. 6.

The method 700 can start, at block 702, where a compute instance of an IaaS service can provide (e.g., implement/execute) a plurality of honeypot servers. Each honeypot server may be implemented in a container may be an emulation of a physical server. Additionally, each honeypot server be identified by a honeypot type. For example, types of honeypots include SMTP honeypots, WebLogic honeypots, HTTP honeypots, FTP honeypots, SSH honeypots, etc. Based on the type, each honeypot may interact with the user differently, process different data, or the like. Additionally, the plurality of honeypots may be considered a honeynet, which can be implemented by a single compute instance either ran locally within the IaaS service or externally (e.g., by a third-party service provider).

The method 700 may, at block, 704, lure, by the compute instance, an attacker to establish a session with at least one of the honeypot servers. The luring may be based on one or more ports associated with IP assigned to the honeypots being exposed over a public network (e.g., the Internet). The luring may also include publishing login credential for the honeypots; however, in most cases, exposing the ports may be good enough to lure attackers because there are various username/password combinations that are known to attackers and the public at large.

The method 700 may, at block 706, receive, by the compute instance, a first request from the attacker. In some instances, the first request may relate to the instance and/or it may include a request characteristic. The first request is usually a request to log into the service that resides on the other side of the port of interest to the attacker. The first request characteristic may identify the port that the request is being sent over, the type of service that is being requested, the type of action that is being requested, etc.

The method 700 may, at block 708, identify, by the compute instance, a particular honeypot server of the plurality of honeypot servers based at least in part on the request characteristic and the honeypot type. For example, if the attacker is requesting access to port 25, and port 25 corresponds to an SMTP server, then the compute instance may identify a honeypot that is emulating an SMTP server for that attacker. In this example, the request characteristic is information that identifies either port 25 or a request to log into a mail (SMTP) server. Using this information, the compute instance can identify the SMTP honeypot (e.g., based on a mapping of characteristics to types) for this potential connection. The particular honeypot that is identified in this example, is the SMTP honeypot.

The method 700 may, at block 710, establish, by the computing instance, a session with the attacker for connection with the particular honeypot. In this way, a session with short-term (e.g., 5 minutes) state may be established. During the session, the attacker will have privileged access to the particular honeypot server that was identified. Once the attacker logs off, a new session will need to be established, either with the same honeypot server or with another type.

The method 700 may, at block, 712, generate, by the particular honeypot server that is connected to the attacker, a response to a second request from the attacker. The second request may be made after the session has been established, thus it may be received from a logged-in attacker. The second request may be a request to spin up a virtual compute instance, to access a secure resource, or the like. Essentially, the second request may any type of request that the attacker may choose to request from the honeypot server they have logged into. The response that is generated should be an appropriate response for that request. For example, if the request is to access a data item, the response should provide that data item, or a dummy version of that data item. If the request is to spin up an virtual compute instance, the response should be confirmation of that instantiation.

The method 700 may, at block 714, cause, by the particular honeypot server, the response to be communicated to the attacker responsive to the second request. As noted above, the response should be appropriate for the given request in order to keep the attacker believing that they are connected to a real server.

The method 700 may end at block 716, where the compute instance may record data related to the attacker or data related to one or more interactions by the attacker with the particular honeypot. This data can be processed and/or analyzed to help prevent future attacks.

Example Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
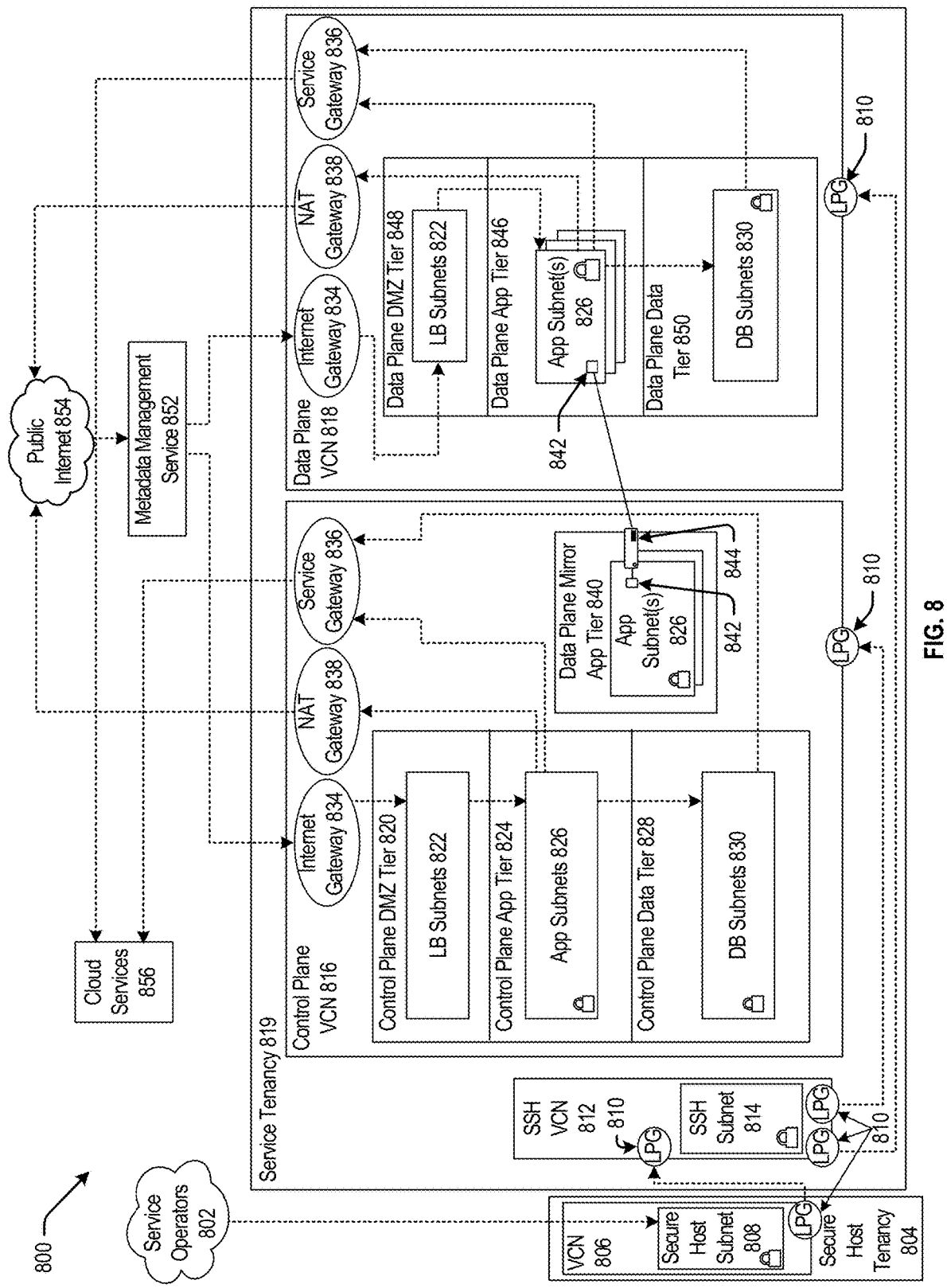
FIG. 8 is a simplified block diagram illustrating one pattern for implementing a cloud infrastructure as a service system according to certain embodiments.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plan VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
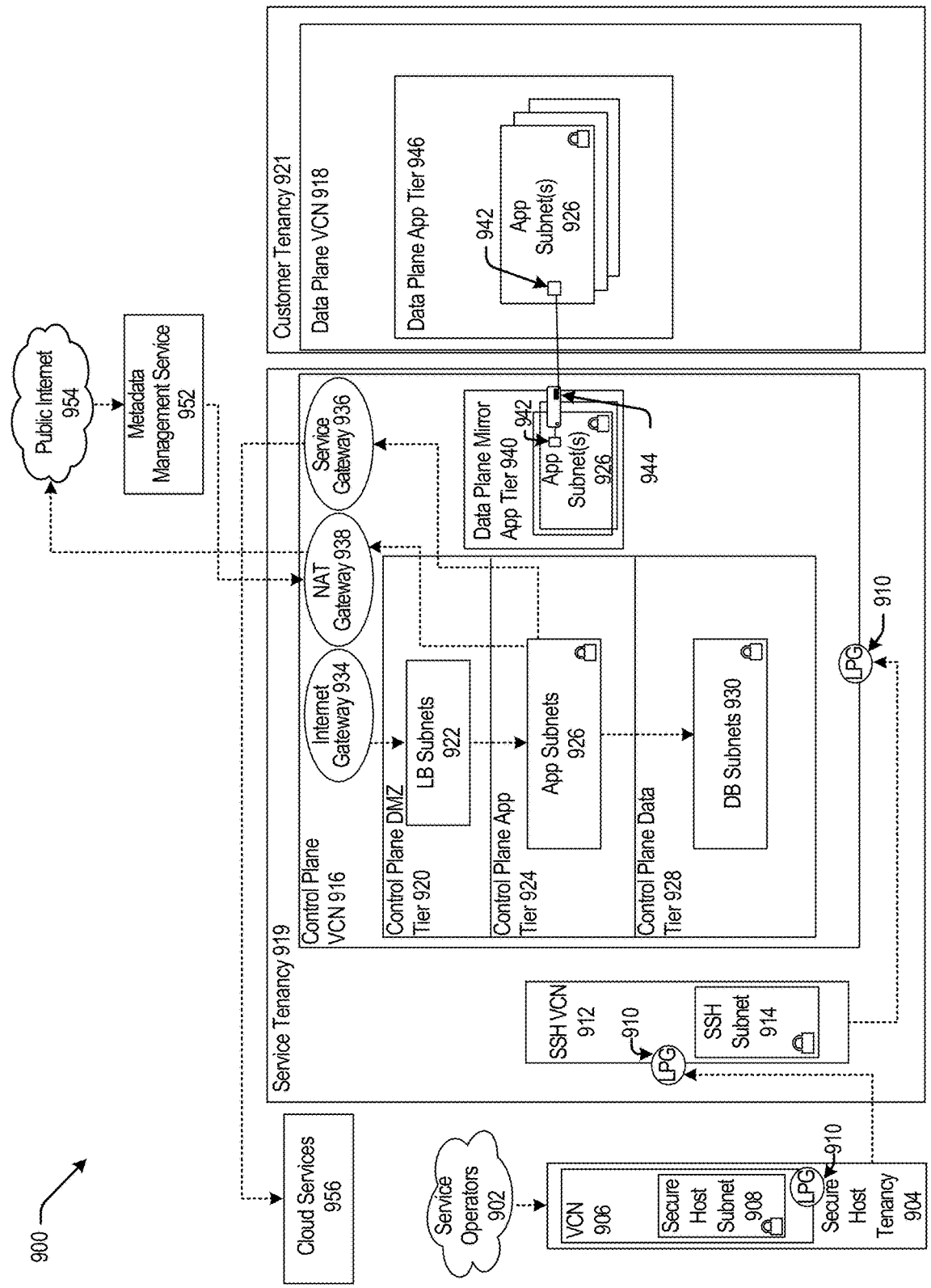
FIG. 9 is a simplified block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
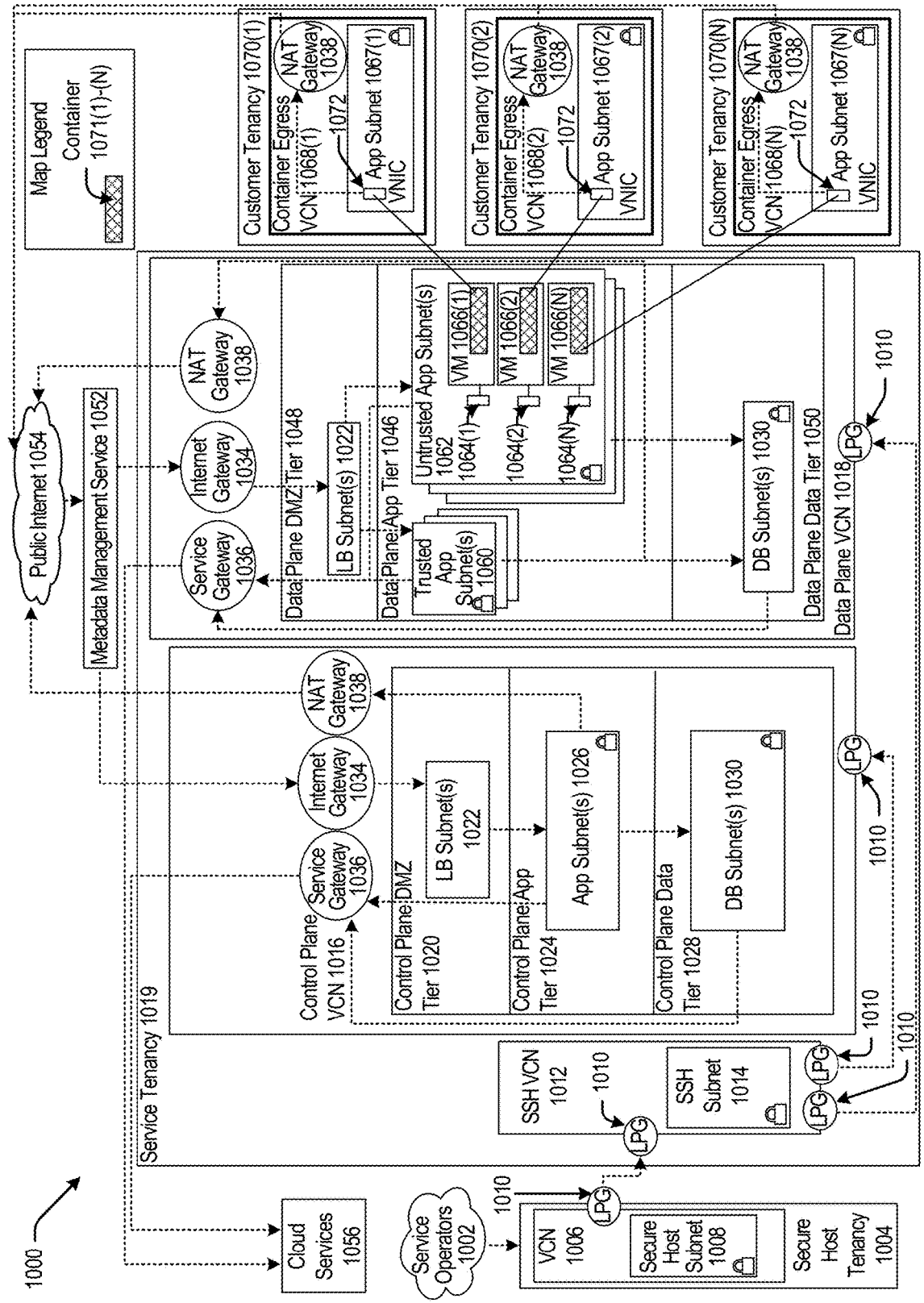
FIG. 10 is a simplified block diagram illustrating another pattern for implementing a cloud infrastructure as a service system according to certain embodiments.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s)

1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
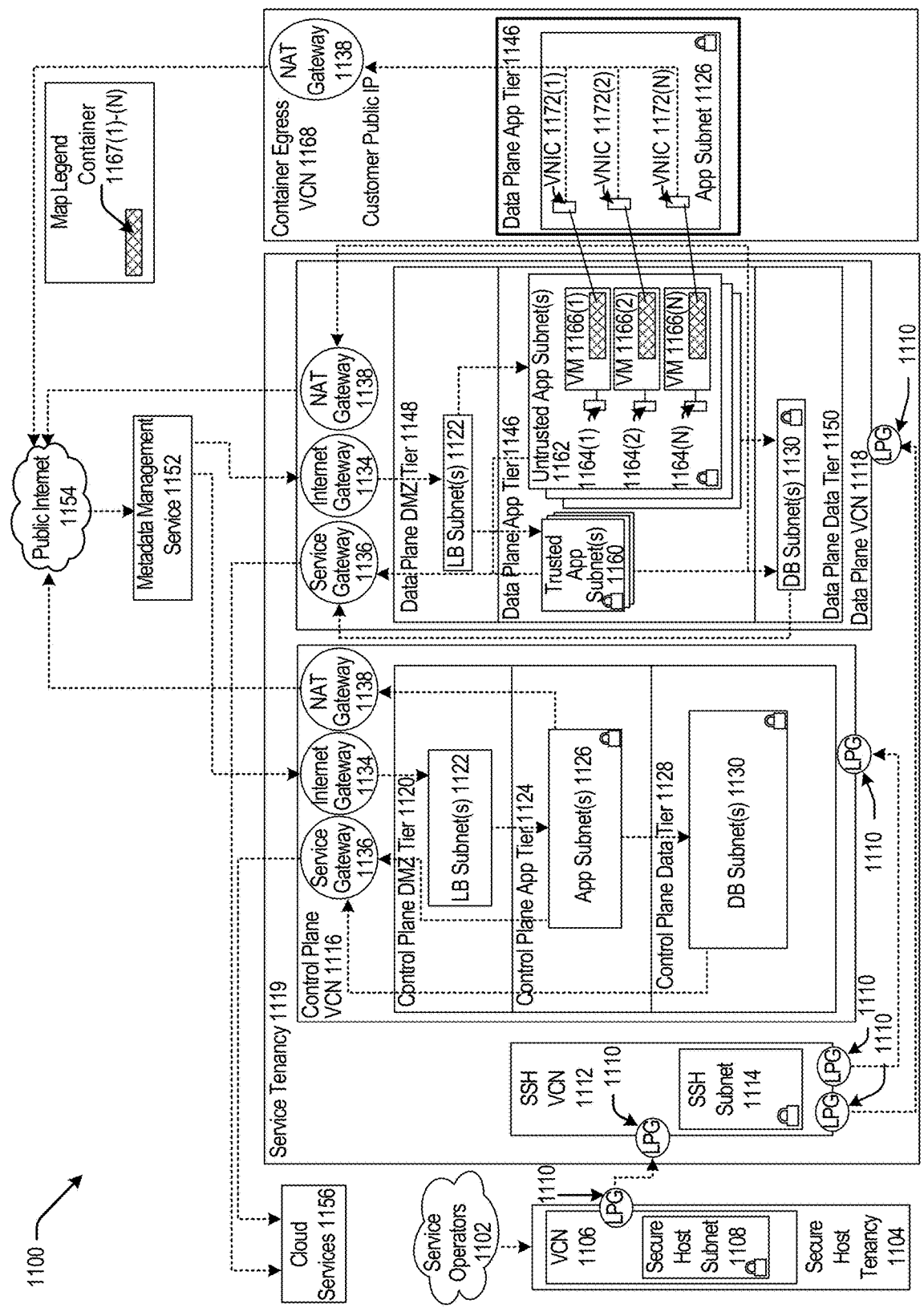
FIG. 11 is a simplified block diagram illustrating another pattern for implementing a cloud infrastructure as a service system according to certain embodiments.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g.

the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
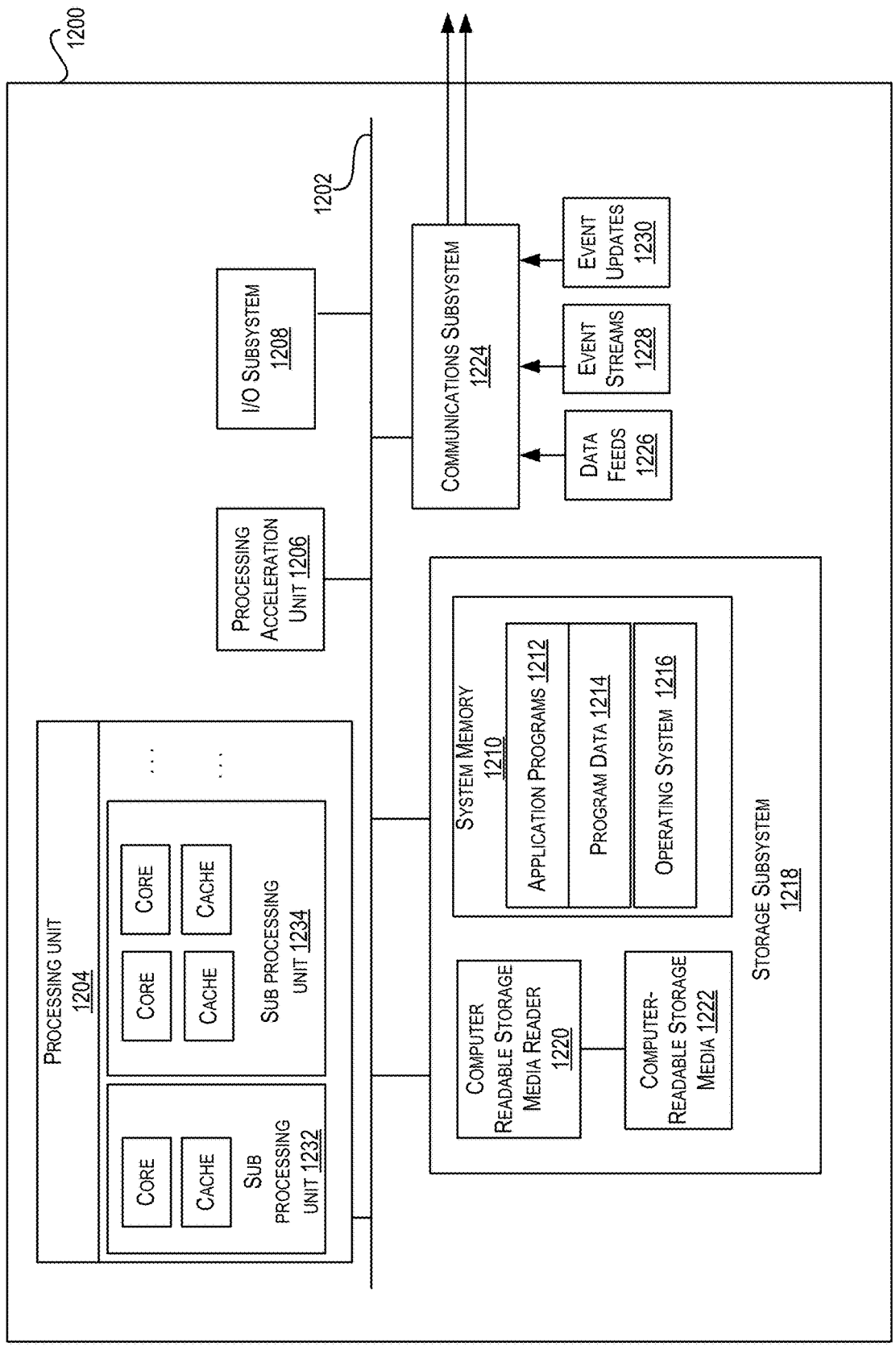
FIG. 12 is a simplified block diagram illustrating an example computer system according to certain embodiments.

FIG. 12 illustrates an example computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
providing, by a computing system, a plurality of honeypot servers implemented on an Infrastructure as a Service (IaaS) layer of the computing system and configured to emulate a different Infrastructure as a Service (IaaS) instance;
receiving, by the computing system, a first request from a third-party entity, the first request associated with a characteristic of a particular honeypot type;
establishing, by the computing system, a session with the third-party entity for connection with a particular honeypot server of the particular honeypot type, the particular honeypot server implemented on the IaaS layer of the computing system;
causing, by the particular honeypot server on the IaaS layer of the computing system, a response to be communicated to the third-party entity responsive to the first request; and
recording, by the computing system, data related to at least one of the third-party entity and data related to one or more interactions between the third-party entity with the particular honeypot server.

2. The method of claim 1, further comprising:
luring, by the computing system, the third-party entity to establish the session with at least one honeypot server of the plurality of honeypot servers.

3. The method of claim 2, wherein the luring comprises exposing one or more ports to a public network, the one or more ports comprise at least one of a Secure Shell (SSH) port 21, a File Transfer Protocol (FTP) port 22, or a simple mail transfer protocol (SMTP) port 25.

4. The method of claim 1, further comprising:
identifying, by the computing system, the particular honeypot server of the plurality of honeypot servers based at least in part on the request characteristic and the honeypot type.

5. The method of claim 1, further comprising:
generating, by the particular honeypot server of the computing system, a response to a second request from the third-party entity, the response configured to appear to be from an IaaS provider.

6. The method of claim 1, wherein the third-party entity is a user using an application to generate at least one of the first request or a second request.

7. The method of claim 1, wherein the particular honeypot server comprises a preset configuration of compute, memory, and networking resources to emulate the IaaS instance.

8. A system, comprising:
one or more processors;
a computer readable, non-transitory memory comprising instructions that, when executed by the one or more processors, cause the system to perform operations to:
provide, by a computing system, a plurality of honeypot servers implemented on an Infrastructure as a Service (IaaS) layer of the computing system and configured to emulate a different Infrastructure as a Service (IaaS) instance;
receive, by the computing system, a first request from a third-party entity, the first request associated with a characteristic of a particular honeypot type;
establish, by the computing system, a session with the third-party entity for connection with a particular honeypot server of the particular honeypot type, the particular honeypot server implemented on the IaaS layer of the computing system;
cause, by the particular honeypot server on the IaaS layer of the computing system, a response to be communicated to the third-party entity responsive to the first request; and
record, by the computing system, data related to at least one of the third-party entity and data related to one or more interactions between the third-party entity with the particular honeypot server.

9. The system of claim 8, further comprising:
identifying, by the computing system, the particular honeypot server of the plurality of honeypot servers based at least in part on the request characteristic and the honeypot type.

10. The system of claim 8, further comprising:
generating, by the particular honeypot server of the computing system, a response to a second request from the third-party entity, the response configured to appear to be from an IaaS provider.

11. The system of claim 8, wherein the third-party entity is a user using an application to generate at least one of the first request or a second request.

12. The system of claim 8, further comprising:
luring, by the computing system, the third-party entity to establish the session with at least one honeypot server of the plurality of honeypot servers.

13. The system of claim 12, wherein the luring comprises exposing one or more ports to a public network, the one or more ports comprise at least one of a Secure Shell (SSH) port 21, a File Transfer Protocol (FTP) port 22, or a simple mail transfer protocol (SMTP) port 25.

14. A non-transitory, computer-readable medium comprising instructions that, when executed by one or more processors, cause the one or more processors to perform operations comprising:
providing, by a computing system, a plurality of honeypot servers implemented on an Infrastructure as a Service (IaaS) layer of the computing system and configured to emulate a different Infrastructure as a Service (IaaS) instance;
receiving, by the computing system, a first request from a third-party entity, the first request associated with a characteristic of a particular honeypot type;
establishing, by the computing system, a session with the third-party entity for connection with a particular honeypot server of the particular honeypot type, the particular honeypot server implemented on the IaaS layer of the computing system;
causing, by the particular honeypot server on the IaaS layer of the computing system, a response to be communicated to the third-party entity responsive to the first request; and
recording, by the computing system, data related to at least one of the third-party entity and data related to one or more interactions between the third-party entity with the particular honeypot server.

15. The computer-readable medium of claim 14, further comprising:
luring, by the computing system, the third-party entity to establish the session with at least one honeypot server of the plurality of honeypot servers.

16. The computer-readable medium of claim 14, further comprising:
identifying, by the computing system, the particular honeypot server of the plurality of honeypot servers based at least in part on the request characteristic and the honeypot type.

17. The computer-readable medium of claim 14, further comprising:
generating, by the particular honeypot server of the computing system, a response to a second request from the third-party entity, the response configured to appear to be from an IaaS provider.

18. The computer-readable medium of claim 14, wherein the third-party entity is a user using an application to generate at least one of the first request or a second request.

* * * * *